(12) United States Patent
Mukerjee et al.

(10) Patent No.: US 7,609,763 B2
(45) Date of Patent: Oct. 27, 2009

(54) ADVANCED BI-DIRECTIONAL PREDICTIVE CODING OF VIDEO FRAMES

(75) Inventors: Kunal Mukerjee, Redmond, WA (US); Sridhar Srinivasan, Seattle, WA (US); Bruce Chih-Lung Lin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1058 days.

(21) Appl. No.: 10/622,378

(22) Filed: Jul. 18, 2003

(65) Prior Publication Data

US 2005/0013365 A1    Jan. 20, 2005

(51) Int. Cl.
H04N 7/12 (2006.01)
H04N 11/02 (2006.01)
H04N 11/04 (2006.01)
H04B 1/66 (2006.01)

(52) U.S. Cl. .................................. 375/240.16
(58) Field of Classification Search .................... None
See application file for complete search history.

(56) References Cited

U.S. PATENT DOCUMENTS

| | | | |
|---|---|---|---|
| 4,051,470 A | 9/1977 | Esteban et al. |
| 4,454,546 A | 6/1984 | Mori |
| 4,661,849 A | 4/1987 | Hinman |
| 4,661,853 A | 4/1987 | Roeder et al. |
| 4,695,882 A | 9/1987 | Wada et al. |
| 4,706,260 A | 11/1987 | Fedele et al. |
| 4,796,087 A | 1/1989 | Guichard et al. |
| 4,849,812 A | 7/1989 | Borgers et al. |
| 4,862,267 A | 8/1989 | Gillard et al. |
| 4,864,393 A | 9/1989 | Harradine et al. |
| 4,937,036 A | 6/1990 | Beard et al. |
| 4,954,892 A | 9/1990 | Asai et al. |
| 5,043,919 A | 8/1991 | Callaway et al. |
| 5,089,887 A | 2/1992 | Robert et al. |
| 5,089,889 A | 2/1992 | Sugiyama |

(Continued)

FOREIGN PATENT DOCUMENTS

EP    0 279 053    8/1988

(Continued)

OTHER PUBLICATIONS

Aksoy, "Wireless Thin Client Optimization for Multimedia Applications," M.S. Thesis, 166 pp. (2000).

(Continued)

*Primary Examiner*—Nhon T Diep
(74) *Attorney, Agent, or Firm*—Klarquist Sparkman, LLP

(57) ABSTRACT

Techniques and tools for coding/decoding of video images, and in particular, B-frames, are described. In one aspect, a video encoder/decoder determines a fraction for a current image in a sequence. The fraction represents an estimated temporal distance position for the current image relative to an interval between a reference images for the current image. The video encoder/decoder processes the fraction along with a motion vector for a first reference image, resulting in a representation of motion (e.g., constant or variable velocity motion) in the current image. Other aspects are also described, including intra B-frames, forward and backward buffers for motion vector prediction, bitplane encoding of direct mode prediction information, multiple motion vector resolutions/interpolation filters for B-frames, proactive dropping of B-frames, and signaling of dropped predicted frames.

51 Claims, 10 Drawing Sheets

U.S. PATENT DOCUMENTS

| | | | |
|---|---|---|---|
| 5,091,782 A | 2/1992 | Krause et al. |
| 5,103,306 A | 4/1992 | Weiman et al. |
| 5,111,292 A | 5/1992 | Kuriacose et al. |
| 5,117,287 A | 5/1992 | Koike et al. |
| 5,132,792 A | 7/1992 | Yonemitsu et al. |
| 5,157,490 A | 10/1992 | Kawai et al. |
| 5,175,618 A | 12/1992 | Ueda |
| 5,185,819 A | 2/1993 | Ng et al. |
| 5,193,004 A | 3/1993 | Wang et al. |
| 5,212,549 A | 5/1993 | Ng et al. |
| 5,223,949 A | 6/1993 | Honjo |
| 5,227,878 A | 7/1993 | Puri et al. |
| 5,235,618 A | 8/1993 | Sakai et al. |
| 5,258,836 A | 11/1993 | Murata |
| 5,260,782 A | 11/1993 | Hui |
| 5,266,941 A | 11/1993 | Akeley et al. |
| 5,287,420 A | 2/1994 | Barrett |
| 5,317,397 A | 5/1994 | Odaka et al. |
| 5,317,672 A | 5/1994 | Crossman et al. |
| 5,335,299 A | 8/1994 | Atkinson |
| 5,343,248 A | 8/1994 | Fujinami |
| 5,347,308 A | 9/1994 | Wai |
| 5,394,170 A | 2/1995 | Akeley et al. |
| 5,412,430 A | 5/1995 | Nagata |
| 5,412,435 A | 5/1995 | Nakajima |
| 5,414,796 A | 5/1995 | Jacobs et al. |
| RE34,965 E | 6/1995 | Sugiyama |
| 5,422,676 A | 6/1995 | Herpel et al. |
| 5,424,779 A | 6/1995 | Odaka |
| 5,426,464 A | 6/1995 | Casavant et al. |
| 5,428,396 A | 6/1995 | Yagasaki |
| 5,442,400 A | 8/1995 | Sun |
| 5,453,799 A | 9/1995 | Yang et al. |
| 5,457,495 A | 10/1995 | Hartung |
| 5,461,421 A | 10/1995 | Moon |
| RE35,093 E | 11/1995 | Wang et al. |
| 5,467,086 A | 11/1995 | Jeong |
| 5,467,134 A | 11/1995 | Laney et al. |
| 5,467,136 A | 11/1995 | Odaka |
| 5,477,272 A | 12/1995 | Zhang et al. |
| RE35,158 E | 2/1996 | Sugiyama |
| 5,491,523 A | 2/1996 | Sato |
| 5,510,840 A | 4/1996 | Yonemitsu et al. |
| 5,539,466 A | 7/1996 | Igarashi et al. |
| 5,565,922 A | 10/1996 | Krause |
| 5,579,430 A | 11/1996 | Grill et al. |
| 5,586,200 A | 12/1996 | Devaney et al. |
| 5,594,504 A | 1/1997 | Ebrahimi |
| 5,598,215 A | 1/1997 | Watanabe |
| 5,598,216 A | 1/1997 | Lee |
| 5,617,144 A | 4/1997 | Lee |
| 5,619,281 A | 4/1997 | Jung |
| 5,621,481 A | 4/1997 | Yasuda et al. |
| 5,623,311 A | 4/1997 | Phillips et al. |
| 5,623,424 A | 4/1997 | Azadegan et al. |
| 5,648,819 A | 7/1997 | Tranchard |
| 5,661,755 A | 8/1997 | Van De Kerkhof et al. |
| 5,666,161 A | 9/1997 | Kohiyama et al. |
| 5,666,461 A | 9/1997 | Igarashi et al. |
| 5,677,735 A | 10/1997 | Ueno et al. |
| 5,678,002 A | 10/1997 | Fawcett et al. |
| 5,686,964 A | 11/1997 | Tabatabai et al. |
| 5,687,097 A | 11/1997 | Mizusawa et al. |
| 5,691,771 A | 11/1997 | Oishi et al. |
| 5,699,476 A | 12/1997 | Van Der Meer |
| 5,701,164 A | 12/1997 | Kato |
| 5,717,441 A | 2/1998 | Serizawa et al. |
| 5,731,850 A | 3/1998 | Maturi et al. |
| 5,742,735 A | 4/1998 | Eberlein et al. |
| 5,745,738 A | 4/1998 | Ricard |
| 5,748,784 A | 5/1998 | Sugiyama |
| 5,764,807 A | 6/1998 | Pearlman |
| 5,764,814 A | 6/1998 | Chen et al. |
| 5,767,898 A | 6/1998 | Urano et al. |
| 5,786,860 A | 7/1998 | Kim et al. |
| 5,787,203 A | 7/1998 | Lee et al. |
| 5,796,438 A | 8/1998 | Hosono |
| 5,798,788 A | 8/1998 | Meehan et al. |
| 5,799,113 A | 8/1998 | Lee |
| RE35,910 E | 9/1998 | Nagata et al. |
| 5,819,215 A | 10/1998 | Dobson et al. |
| 5,822,541 A | 10/1998 | Nonomura et al. |
| 5,825,310 A | 10/1998 | Tsutsui |
| 5,835,144 A | 11/1998 | Matsumura et al. |
| 5,835,146 A | 11/1998 | Stone |
| 5,835,149 A | 11/1998 | Astle |
| 5,844,613 A | 12/1998 | Chaddha |
| 5,845,243 A | 12/1998 | Smart et al. |
| 5,847,776 A | 12/1998 | Khmelnitsky |
| 5,859,668 A | 1/1999 | Aono et al. |
| 5,874,995 A | 2/1999 | Naimpally et al. |
| 5,901,248 A | 5/1999 | Fandrianto et al. |
| 5,923,375 A | 7/1999 | Pau |
| 5,926,226 A | 7/1999 | Proctor et al. |
| 5,926,573 A | 7/1999 | Kim et al. |
| 5,929,940 A | 7/1999 | Jeannin |
| 5,933,451 A | 8/1999 | Ozkan et al. |
| 5,946,042 A | 8/1999 | Kato |
| 5,946,419 A | 8/1999 | Chen et al. |
| 5,949,489 A | 9/1999 | Nishikawa et al. |
| 5,952,943 A | 9/1999 | Walsh et al. |
| 5,959,673 A | 9/1999 | Lee et al. |
| 5,963,258 A | 10/1999 | Nishikawa et al. |
| 5,963,673 A | 10/1999 | Kodama et al. |
| 5,970,173 A | 10/1999 | Lee et al. |
| 5,970,175 A | 10/1999 | Nishikawa et al. |
| 5,973,743 A | 10/1999 | Han |
| 5,973,755 A | 10/1999 | Gabriel |
| 5,974,184 A | 10/1999 | Eifrig |
| 5,982,438 A | 11/1999 | Lin et al. |
| 5,986,712 A | 11/1999 | Peterson et al. |
| 5,990,960 A | 11/1999 | Murakami et al. |
| 5,991,447 A | 11/1999 | Eifrig et al. |
| 5,995,151 A | 11/1999 | Naveen et al. |
| 6,002,439 A | 12/1999 | Murakami et al. |
| 6,005,980 A | 12/1999 | Eifrig et al. |
| RE36,507 E | 1/2000 | Iu |
| 6,011,596 A | 1/2000 | Burl et al. |
| 6,026,195 A | 2/2000 | Eifrig et al. |
| 6,029,126 A | 2/2000 | Malvar |
| 6,040,863 A | 3/2000 | Kato |
| 6,055,012 A * | 4/2000 | Haskell et al. ................. 348/48 |
| 6,058,362 A | 5/2000 | Malvar |
| 6,067,322 A | 5/2000 | Wang |
| 6,072,831 A | 6/2000 | Chen |
| 6,078,618 A | 6/2000 | Yokoyama et al. |
| 6,081,209 A | 6/2000 | Schuyler et al. |
| 6,094,225 A | 7/2000 | Han |
| RE36,822 E | 8/2000 | Sugiyama |
| 6,097,759 A | 8/2000 | Murakami et al. |
| 6,111,914 A | 8/2000 | Bist |
| 6,115,689 A | 9/2000 | Malvar |
| 6,130,963 A | 10/2000 | Uz et al. |
| 6,154,495 A | 11/2000 | Yamaguchi et al. |
| 6,160,846 A | 12/2000 | Chiang et al. |
| 6,167,090 A | 12/2000 | Iizuka |
| 6,175,592 B1 | 1/2001 | Kim et al. |
| 6,182,034 B1 | 1/2001 | Malvar |
| 6,188,725 B1 | 2/2001 | Sugiyama |
| 6,188,794 B1 | 2/2001 | Nishikawa et al. |
| 6,192,081 B1 | 2/2001 | Chiang et al. |
| 6,201,927 B1 | 3/2001 | Comer |
| 6,205,176 B1 | 3/2001 | Sugiyama |
| 6,205,177 B1 | 3/2001 | Girod et al. |

| | | | | | | |
|---|---|---|---|---|---|---|
| 6,208,761 B1 | 3/2001 | Passagio et al. | 6,900,846 B2 | 5/2005 | Lee et al. | |
| 6,212,232 B1 | 4/2001 | Reed et al. | 6,920,175 B2 | 7/2005 | Karczewicz et al. | |
| 6,215,820 B1 | 4/2001 | Bagni et al. | 6,975,680 B2 | 12/2005 | Demos | |
| 6,219,464 B1 | 4/2001 | Greggain et al. | 6,980,596 B2 | 12/2005 | Wang et al. | |
| 6,226,407 B1 | 5/2001 | Zabih et al. | 6,999,513 B2 | 2/2006 | Sohn et al. | |
| 6,236,806 B1 | 5/2001 | Kojima et al. | 7,003,035 B2 | 2/2006 | Tourapis et al. | |
| 6,240,380 B1 | 5/2001 | Malvar | 7,020,200 B2 | 3/2006 | Winger | |
| RE37,222 E | 6/2001 | Yonemitsu et al. | 7,054,494 B2 | 5/2006 | Lin et al. | |
| 6,243,418 B1 | 6/2001 | Kim | 7,092,576 B2 | 8/2006 | Srinivasan et al. | |
| 6,243,497 B1 | 6/2001 | Chiang et al. | 7,154,952 B2 * | 12/2006 | Tourapis et al. | 375/240.16 |
| 6,256,345 B1 | 7/2001 | Cho | 7,233,621 B2 | 6/2007 | Jeon | |
| 6,259,810 B1 | 7/2001 | Gill et al. | 7,317,839 B2 | 1/2008 | Holcomb | |
| 6,263,024 B1 | 7/2001 | Matsumoto | 7,362,807 B2 * | 4/2008 | Kondo et al. | 375/240.16 |
| 6,263,065 B1 | 7/2001 | Durinovic-Johri et al. | 7,453,941 B1 | 11/2008 | Yamori et al. | |
| 6,269,121 B1 | 7/2001 | Kwak | 2001/0019586 A1 | 9/2001 | Kang et al. | |
| 6,271,885 B2 | 8/2001 | Sugiyama | 2001/0040926 A1 | 11/2001 | Hannuksela et al. | |
| 6,275,528 B1 | 8/2001 | Isozaki et al. | 2002/0012394 A1 | 1/2002 | Hatano et al. | |
| 6,275,531 B1 | 8/2001 | Li | 2002/0105596 A1 | 8/2002 | Selby | |
| 6,278,735 B1 | 8/2001 | Mohsenian | 2002/0114388 A1 | 8/2002 | Ueda | |
| 6,282,243 B1 | 8/2001 | Kazui et al. | 2002/0143556 A1 | 10/2002 | Kadatch | |
| 6,292,585 B1 | 9/2001 | Yamaguchi et al. | 2002/0154693 A1 | 10/2002 | Demos | |
| 6,295,376 B1 | 9/2001 | Nakaya | 2002/0168066 A1 | 11/2002 | Li | |
| 6,304,928 B1 | 10/2001 | Mairs et al. | 2002/0176624 A1 | 11/2002 | Kostrzewski et al. | |
| 6,307,887 B1 | 10/2001 | Gabriel | 2002/0186890 A1 | 12/2002 | Lee et al. | |
| 6,307,973 B2 | 10/2001 | Nishikawa et al. | 2003/0053537 A1 | 3/2003 | Kim et al. | |
| 6,320,593 B1 | 11/2001 | Sobel et al. | 2003/0099292 A1 | 5/2003 | Wang et al. | |
| 6,324,216 B1 | 11/2001 | Igarashi et al. | 2003/0099294 A1 | 5/2003 | Wang et al. | |
| 6,332,003 B1 | 12/2001 | Matsuura | 2003/0110236 A1 | 6/2003 | Yang et al. | |
| 6,337,881 B1 | 1/2002 | Chaddha | 2003/0112864 A1 | 6/2003 | Karczewicz et al. | |
| 6,370,502 B1 | 4/2002 | Wu et al. | 2003/0113026 A1 | 6/2003 | Srinivasan et al. | |
| 6,377,628 B1 | 4/2002 | Schultz et al. | 2003/0115041 A1 | 6/2003 | Chen | |
| 6,381,275 B1 | 4/2002 | Fukuhara et al. | 2003/0115042 A1 | 6/2003 | Chen | |
| 6,381,279 B1 | 4/2002 | Taubman | 2003/0115050 A1 | 6/2003 | Chen | |
| 6,393,059 B1 | 5/2002 | Sugiyama | 2003/0115051 A1 | 6/2003 | Chen | |
| 6,404,813 B1 | 6/2002 | Haskell et al. | 2003/0115052 A1 | 6/2003 | Chen | |
| 6,421,383 B2 | 7/2002 | Beattie | 2003/0125932 A1 | 7/2003 | Wang et al. | |
| 6,421,738 B1 | 7/2002 | Ratan et al. | 2003/0142748 A1 | 7/2003 | Tourapis | |
| 6,427,027 B1 | 7/2002 | Suzuki et al. | 2003/0142751 A1 * | 7/2003 | Hannuksela | 375/240.25 |
| 6,442,204 B1 | 8/2002 | Snook et al. | 2003/0152146 A1 | 8/2003 | Lin et al. | |
| 6,459,812 B2 | 10/2002 | Suzuki et al. | 2003/0161402 A1 | 8/2003 | Horowitz | |
| 6,473,409 B1 | 10/2002 | Malvar | 2003/0179826 A1 | 9/2003 | Jeon | |
| 6,483,874 B1 | 11/2002 | Panusopone et al. | 2003/0206589 A1 | 11/2003 | Jeon | |
| 6,496,601 B1 | 12/2002 | Migdal et al. | 2004/0001546 A1 | 1/2004 | Tourapis et al. | |
| 6,501,397 B1 | 12/2002 | Radha et al. | 2004/0008899 A1 | 1/2004 | Tourapis et al. | |
| 6,519,287 B1 | 2/2003 | Hawkins et al. | 2004/0042549 A1 | 3/2004 | Huang et al. | |
| 6,522,693 B1 | 2/2003 | Lu et al. | 2004/0047418 A1 | 3/2004 | Tourapis et al. | |
| 6,529,632 B1 | 3/2003 | Nakaya et al. | 2004/0136457 A1 | 7/2004 | Funnell et al. | |
| 6,539,056 B1 | 3/2003 | Sato et al. | 2004/0139462 A1 * | 7/2004 | Hannuksela et al. | 725/32 |
| 6,563,953 B2 | 5/2003 | Lin et al. | 2004/0141651 A1 | 7/2004 | Hara et al. | |
| 6,573,905 B1 | 6/2003 | MacInnis et al. | 2004/0146109 A1 | 7/2004 | Kondo et al. | |
| 6,573,915 B1 | 6/2003 | Sivan et al. | 2005/0013497 A1 | 1/2005 | Hsu et al. | |
| 6,574,593 B1 | 6/2003 | Gao et al. | 2005/0013498 A1 | 1/2005 | Srinivasan | |
| 6,614,442 B1 | 9/2003 | Ouyang et al. | 2005/0015528 A1 | 1/2005 | Du | |
| 6,636,565 B1 | 10/2003 | Kim | 2005/0036759 A1 | 2/2005 | Lin et al. | |
| 6,647,061 B1 | 11/2003 | Panusopone et al. | 2005/0053137 A1 | 3/2005 | Holcomb | |
| 6,650,781 B2 | 11/2003 | Nakaya | 2005/0053146 A1 | 3/2005 | Mukerjee | |
| 6,654,417 B1 | 11/2003 | Hui | 2005/0053147 A1 | 3/2005 | Mukerjee et al. | |
| 6,654,419 B1 | 11/2003 | Sriram et al. | 2005/0053149 A1 | 3/2005 | Mukerjee et al. | |
| 6,654,420 B1 | 11/2003 | Snook | 2005/0053156 A1 | 3/2005 | Lin et al. | |
| 6,683,987 B1 | 1/2004 | Sugahara | 2005/0053292 A1 | 3/2005 | Mukerjee et al. | |
| 6,704,360 B2 | 3/2004 | Haskell et al. | 2005/0053297 A1 | 3/2005 | Mukerjee et al. | |
| 6,728,317 B1 | 4/2004 | Demos | 2005/0053298 A1 | 3/2005 | Mukerjee et al. | |
| 6,735,345 B2 | 5/2004 | Lin et al. | 2005/0084166 A1 | 4/2005 | Boneh et al. | |
| RE38,563 E | 8/2004 | Eifrig et al. | 2005/0100093 A1 | 5/2005 | Holcomb | |
| 6,785,331 B1 | 8/2004 | Jozawa et al. | 2005/0129120 A1 * | 6/2005 | Jeon | 375/240.15 |
| 6,798,364 B2 | 9/2004 | Chen et al. | 2005/0135484 A1 | 6/2005 | Lee | |
| 6,810,083 B2 | 10/2004 | Chen et al. | 2005/0147167 A1 | 7/2005 | Dumitras et al. | |
| 6,816,552 B2 | 11/2004 | Demos | 2005/0157784 A1 | 7/2005 | Tanizawa et al. | |
| 6,819,714 B2 | 11/2004 | Yamada et al. | 2005/0254584 A1 | 11/2005 | Kim et al. | |
| 6,862,402 B2 | 3/2005 | Kim | 2006/0013307 A1 | 1/2006 | Olivier et al. | |
| 6,873,657 B2 | 3/2005 | Yang et al. | 2006/0072662 A1 | 4/2006 | Tourapis et al. | |
| 6,876,703 B2 | 4/2005 | Ismaeil et al. | 2006/0280253 A1 | 12/2006 | Tourapis et al. | |
| 6,895,050 B2 | 5/2005 | Lee | | | | |

| | | | |
|---|---|---|---|
| 2007/0064801 A1 * | 3/2007 | Wang et al. | 375/240.12 |

FOREIGN PATENT DOCUMENTS

| | | |
|---|---|---|
| EP | 0 397 402 | 11/1990 |
| EP | 0 526 163 | 2/1993 |
| EP | 0 535 746 | 4/1993 |
| EP | 0 540 350 | 5/1993 |
| EP | 0 588 653 | 3/1994 |
| EP | 0 614 318 | 9/1994 |
| EP | 0 625 853 | 11/1994 |
| EP | 0 771 114 | 5/1997 |
| EP | 0 782 343 | 7/1997 |
| EP | 0 786 907 | 9/1997 |
| EP | 0 830 029 | 3/1998 |
| EP | 0 863 673 A1 | 9/1998 |
| EP | 0 863 674 | 9/1998 |
| EP | 0 863 675 | 9/1998 |
| EP | 0 884 912 | 12/1998 |
| EP | 0 901 289 | 3/1999 |
| EP | 0 944 245 | 9/1999 |
| EP | 1 006 732 | 7/2000 |
| EP | 1 085 763 | 3/2001 |
| GB | 2328337 | 2/1999 |
| GB | 2332115 | 6/1999 |
| JP | 61205086 | 9/1986 |
| JP | 62 213 494 | 9/1987 |
| JP | 3-001688 | 1/1991 |
| JP | 3 129 986 | 3/1991 |
| JP | 6 078 298 | 3/1994 |
| JP | 6-078295 | 3/1994 |
| JP | 06-276481 | 9/1994 |
| JP | 06-276511 | 9/1994 |
| JP | 7-274171 | 10/1995 |
| JP | 08-140099 | 5/1996 |
| JP | 09-121355 | 5/1997 |
| JP | 09-322163 | 12/1997 |
| JP | 10 056 644 | 2/1998 |
| JP | 11 136683 | 5/1999 |
| JP | 2000-270332 | 9/2000 |
| JP | 2000-287177 | 10/2000 |
| JP | 2002-152752 | 5/2002 |
| JP | 6-292188 | 10/2004 |
| KR | 102002005365 A | 1/2002 |
| RU | 2182727 C2 | 5/2002 |
| WO | WO 00/33581 | 8/2000 |
| WO | WO 01/95633 | 12/2001 |
| WO | WO 02/37859 | 5/2002 |
| WO | WO 02/062074 | 8/2002 |
| WO | WO 03/026296 | 3/2003 |
| WO | WO 2005/004491 | 1/2005 |

OTHER PUBLICATIONS

Caetano et al., "Rate Control Strategy for Embedded Wavelet Video Coders," *Electronics Letters*, pp. 1815-1817 (Oct. 14, 1999).
Dalgic et al., "Characterization of Quality and Traffic for Various Video Encoding Schemes and Various Encoder Control Schemes," Technical Report No. CSL-TR-96-701 (Aug. 1996).
Doering, "Low-Cost, High-Impact Video Production Techniques for Laboratory Instructional Materials," *ASEE/IEEE Frontiers in Education Conference*, Session F1C, pp. 14-18 (Oct. 2001).
ISO/IEC 13818-7, "Information Technology-Generic Coding of Moving Pictures and Associated Audio Information," Part 7: Advanced Audio Coding (AAC), pp. i-iv, 1-145 (1997).
U.S. Appl. No. 60/341,674, filed Dec. 17, 2001, Lee et al.
ISO/IEC 13818-7, Technical Corrigendum 1, "Information Technology-Generic Coding of Moving Pictures and Associated Audio Information," Part 7: Advanced Audio Coding (AAC), Technical Corrigendum, pp. 1-22 (1997).
ISO, "MPEG-4 Video Verification Model version 18.0," ISO/IEC JTC1/SC29/WG11 N3908, Pisa, pp. 1-10, 299-311 (Jan. 2001).
ITU, Recommendation ITU-R BS 1115, Low Bit-Rate Audio Coding, 9 pp. (1994).
Li et al., "Optimal Linear Interpolation Coding for Server-Based Computing," *Proc. IEEE Int'l Conf. on Communications*, 5 pp. (Apr.-May 2002).
Reader, "History of MPEG Video Compression—Ver. 4.0," 99 pp., document marked Dec. 16, 2003.
Ribas Corbera et al., "Rate Control in DCT Video Coding for Low-Delay Communications," *IEEE Transactions on Circuits and Systems for Video Technology*, vol. 9, No. 1, pp. 172-185 (Feb. 1999).
Ronda et al., "Rate Control and Bit Allocation for MPEG-4," *IEEE Transactions on Circuits and Systems for Video Technology*, pp. 1243-1258 (1999).
Schulzrinne, "Operating System Issues for Continuous Media," *ACM Multimedia Systems*, vol. 4, No. 5, 13 pp. (1996).
Sjoberg et al., "Run-length Coding of Skipped Macroblocks," ITU-T SG16/Q.6 VCEG-M57, pp. 1-5 (Apr. 2001).
Vetro et al., "An Overview of MPEG-4 Object-Based Encoding Algorithms," *IEEE 2001 Int'l Symp. on Information Tech. (ITCC 2001)*, Las Vegas, NV, pp. 366-369 (2001).
Westerink et al., "Two-pass MPEG-2 Variable-bit-rate Encoding," *IBM J. Res. Develop.*, vol. 43, No. 4, pp. 471-488 (1999).
Wu et al., "Joint estimation of forward and backward motion vectors for interpolative prediction of video," *IEEE Transactions on Image Processing* 3(5):684-687 (Sep. 1994).
Printouts of FTP directories from http://ftp3.itu.ch , 8 pp. (downloaded from the World Wide Web on Sep. 20, 2005.).
Mook, "Next-Gen Windows Media Player Leaks to the Web," *BetaNews*, 17 pp. (Jul. 19, 2002) [Downloaded from the World Wide Web on Aug. 8, 2003].
Vicars-Harris, "An Overview of Advanced Systems Format," 3 pp. (May 2003) [Downloaded from the World Wide Web on Mar. 16, 2004].
ITU-T, "ITU-T Recommendation H.261: Video Codec for Audiovisual Services at p×64 kbits," 28 pp. (1993).
ITU-T, "ITU-T Recommendation H.262: Information Technology—Generic Coding of Moving Pictures and Associated Audio Information: Video1," 218 pp. (1995).
ITU-T, "ITU-T Recommendation H.263: Video Coding for Low Bit Rate Communication," 167 pp. (1998).
ISO/IEC, "ISO/IEC 11172-2: Information Technology—Coding of Moving Pictures and Associated Audio for Storage Media at up to About 1,5 Mbit/s," 122 pp. (1993).
ISO/IEC, "Information Technology—Coding of Audio-Visual Objects: Visual, ISO/IEC 14496-2, Committee Draft," 330 pp. (1998).
Joint Video Team of ISO/IEC MPEG and ITU-T VCEG, "Committee Draft of Joint Video Specification (ITU-T Recommendation H.264, ISO/IEC 14496-10 AVC," 142 pp. (Aug. 2002).
Chalidabhongse et al., "Fast motion vector estimation using multiresolution spatio-temporal correlations," IEEE Transactions on Circuits and Systems for Video Technology, pp. 477-488 (Jun. 1997).
Joint Video Team (JVT) of ISO/IEC MPEG and ITU-T VCEG, "Study of Final Committee Draft of Joint Video Specification," JVT-F100, Awaji Island, 242 pp. (Dec. 2002).
Kossentini et al., "Predictive RD Optimized Motion Estimation for Very Low Bit-rate Video Coding," IEEE J. on Selected Areas in Communications, vol. 15, No. 9 pp. 1752-1763 (Dec. 1997).
Lainema et al., "Skip Mode Motion Compensation," Joint Video Team (JVT) of ISO/IEC MPEG & ITU-T VCEG (ISO/IEC JTC1/SC29/WG11 and ITU-T SG16 Q.6), Document JVT-C027, 8 pp. (May 2002).
Panusopone et al., "Direct Prediction for Predictive (P) Picture in Field Coding mode," Joint Video Team (JVT) of ISO/IEC MPEG & ITU-T VCEG, Document JVT-D046, 8 pp. (Jul. 2002).
Reed et al., "Constrained Bit-Rate Control for Very Low Bit-Rate Streaming-Video Applications," IEEE Transactions on Circuits and Systems for Video Technology, vol. 11, No. 7, pp. 882-889 (Jul. 2001).
Schwarz et al., "Tree-structured macroblock partition," ITU-T SG16/Q.6 VCEG-O17, 6 pp. (Dec. 2001).
Schwarz et al., "Core Experiment Results On Improved Macroblock Prediction Modes," Joint Video Team (JVT) of ISO/IEC MPEG & ITU-T VCEG (ISO/IEC JTC1/SC29/WG11 and ITU-T SG16 Q.6), Document JVT-B054, 10 pp. (Jan.-Feb. 2002).

Tourapis et al., "Direct Prediction for Predictive (P) and Bidirectionally Predictive (B) frames in Video Coding," Joint Video Team (JVT) of ISO/IEC MPEG & ITU-T VCEG (ISO/IEC JTC1/SC29/WG11 and ITU-T SG16 Q.6), Document JVT-C128, 11 pp. (May 2002).

Tourapis et al., "Motion Vector Prediction in Bidirectionally Predictive (B) frames with regards to Direct Mode," Joint Video Team (JVT) of ISO/IEC MPEG & ITU-T VCEG (ISO/IEC JTC1/SC29/WG11 and ITU-T SG16 Q.6), Document JVT-C127, 7 pp. (May 2002).

Tourapis et al., "Timestamp Independent Motion Vector Prediction for P and B frames with Division Elimination," Joint Video Team (JVT) of ISO/IEC MPEG & ITU-T VCEG (ISO/IEC JTC1/SC29/WG11 and ITU-T SG16 Q.6), Document JVT-D040, 18 pp. (Jul. 2002).

Tourapis et al., "Performance Comparison of Temporal and Spatial Direct mode," Joint Video Team (JVT) of ISO/IEC MPEG & ITU-T VCEG (ISO/IEC JTC1/SC29/WG11 and ITU-T SG16 Q.6), Document JVT-E026, 7 pp. (Oct. 2002).

Wiegand et al., "Motion-compensating Long-term Memory Prediction," Proc. Int'l Conf. on Image Processing, 4 pp. (Oct. 1997).

Wiegand et al., "Long-term Memory Motion Compensated Prediction," IEEE Transactions on Circuits & Systems for Video Technology, vol. 9, No. 1, pp. 70-84 (Feb. 1999).

Wien, "Variable Block-Size Transforms for Hybrid Video Coding," Dissertation, 182 pp. (Feb. 2004).

Tourapis et al., "Predictive Motion Vector Field Adaptive Search Technique (PMVFAST)—Enhancing Block Based Motion Estimation," *Proc. Visual Communications and Image Processing*, 10 pp. (Jan. 2001).

U.S. Appl. No. 60/501,081, filed Sep. 7, 2003, Srinivasan et al.

Patel et al., "Performance of a Software MPEG Video Decoder," *Proc. Of the First ACM Intl Conf on Multimedia*, pp. 75-82 (1993).

Wang et al., "Adaptive frame/field coding for JVT Video Coding," ITU-T SG16 Q.6 JVT-B071, 24 pp. (2002).

Watkinson, *The MPEG Handbook*, pp. 256-260 (2004).

Borgwardt, "Core Experiment on Interlaced Video Coding," ITU Study Group 16 Question 16, VCEG-N85, 10 pp. (Oct. 2001).

U.S. Appl. No. 60/488,710, filed Jul. 18, 2003, Srinivasan et al.

Conklin et al., "Multi-resolution Motion Estimation," Proc. ICASSP '97, Munich, Germany, 4 pp. (1997).

Ericsson, "Fixed and Adaptive Predictors for Hybrid Predictive/Transform Coding," IEEE Transactions on Comm., vol. COM-33, No. 12, pp. 1291-1302 (1985).

Flierl et al., "Multihypothesis Motion Estimation for Video Coding," Proc. DCC, 10 pp. (Mar. 2001).

Girod, "Efficiency Analysis of Multihypothesis Motion-Compensated Prediction for Video Coding," IEEE Transactions on Image Processing, vol. 9, No. 2, pp. 173-183 (Feb. 2000).

Girod, "Motion-Compensation: Visual Aspects, Accuracy; and Fundamental Limits," Motion Analysis and Image Sequence Processing, Kluwer Academic Publishers, pp. 125-152 (1993).

Horn et al., "Estimation of Motion Vector Fields for Multiscale Motion Compensation," Proc. Picture Coding Symp. (PCS 97), pp. 141-144 (Sep. 1997).

Hsu et al., "A Low Bit-Rate Video Codec Based on Two-Dimensional Mesh Motion Compensation with Adaptive Interpolation," *IEEE Transactions on Circuits and Systems for Video Technology*, vol. 11, No. 1, pp. 111-117 (Jan. 2001).

ITU—Q15-F-24, "MVC Video Codec—Proposal for H.26L," Study Group 16, Video Coding Experts Group (Question 15), 28 pp. (document marked as generated in 1998).

ITU-T Recommendation T.6: Facsimile Coding Schemes and Coding Control Functions for Group 4 Facsimile Apparatus, Facicle VII.3 of the Blue Book (1988).

Joint Video Team (JVT) of ISO/IEC MPEG and ITU-T VCEG, "Joint Model No. 1, Revision 1 (JM-1r1)," JVT-A003r1, Pattaya, Thailand, 80 pp. (Dec. 2001).

Joint Video Team of ISO/IEC MPEG and ITU-T VCEG, "Joint Final Committee Draft (JFCD) of Joint Video Specification (ITU-T Recommendation H.264, ISO/IEC 14496-10 AVC," JVT-D157, 218 pp. (Aug. 2002).

Konrad et al., "On Motion Modeling and Estimation for Very Low Bit Rate Video Coding," Visual Comm. & Image Processing (VCIP '95), 12 pp. (May 1995).

Microsoft Corporation, "Microsoft Debuts New Windows Media Players 9 Series, Redefining Digital Media on the PC," 4 pp. (Sep. 4, 2002) [Downloaded from the World Wide Web on May 14, 2004].

Ribas-Corbera et al., "On the Optimal Motion Vector Accuracy for Block-based Motion-Compensated Video Coders," Proc. SPIE Digital Video Compression, San Jose, CA, 13 pp. (1996).

Sullivan et al.., "Rate-Distortion Optimization for Video Compression," *IEEE Signal Processing Magazine*, pp. 74-90 (Nov. 1998).

Sullivan et al., "The H.264/AVC Advanced Video Coding Standard: Overview and Introduction to the Fidelity Range Extensions," 21 pp. (Aug. 2004).

Tao et al., "Adaptive Model-driven Bit Allocation for MPEG Video Coding," *IEEE Transactions on Circuits and Systems for Video Tech.*, vol. 10, No. 1, pp. 147-157 (Feb. 2000).

"The TML Project WEB-Page and Archive," (including pages of code marked "image.cpp for H.26L decoder, Copyright 1999" and "image.c"), 24 pp.

Yu et al., "Two-Dimensional Motion Vector Coding for Low Bitrate Videophone Applications," Proc. Int'l Conf. on Image Processing, Los Alamitos, US, pp. 414-417, IEEE Comp. Soc. Press (1995).

Wang et al., "Interlace Coding Tools for H.26L Video Coding," *Fifteenth Meeting of ITU Telecommunications Standardization Sector, Study Group 16, VCEG*, Thailand (Dec. 2001).

\* cited by examiner

Figure 1, prior art
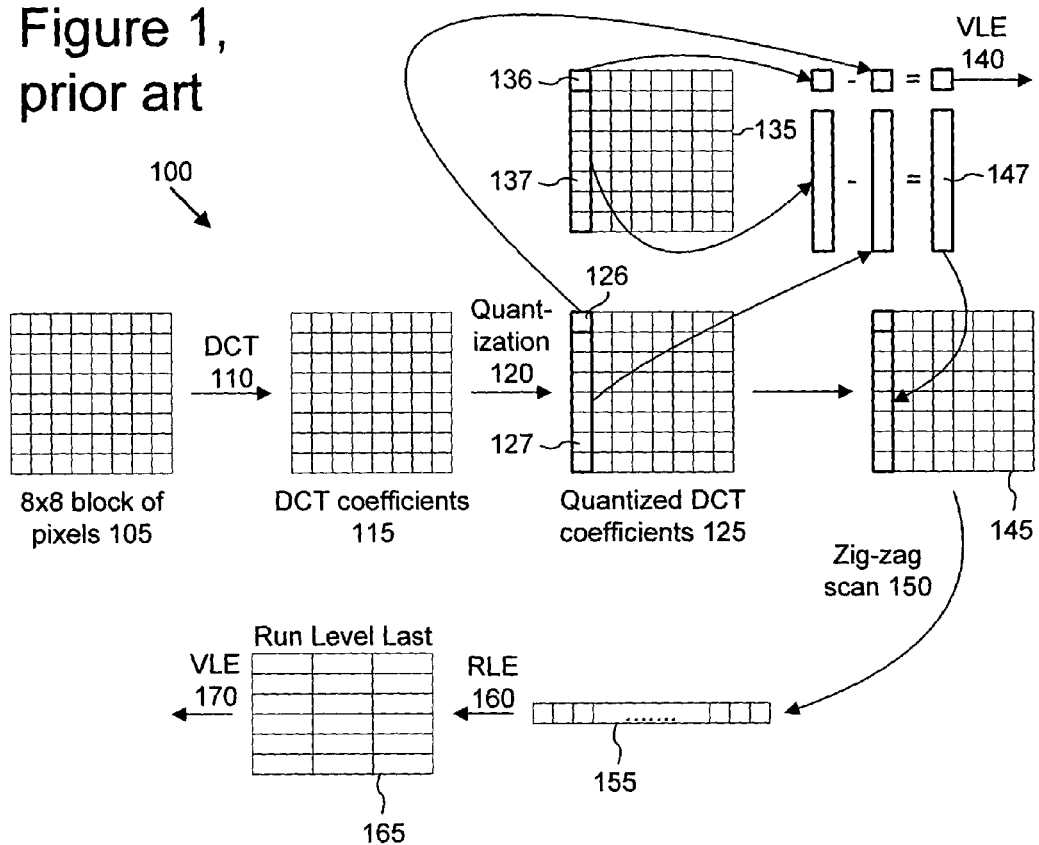
Figure 2, prior art
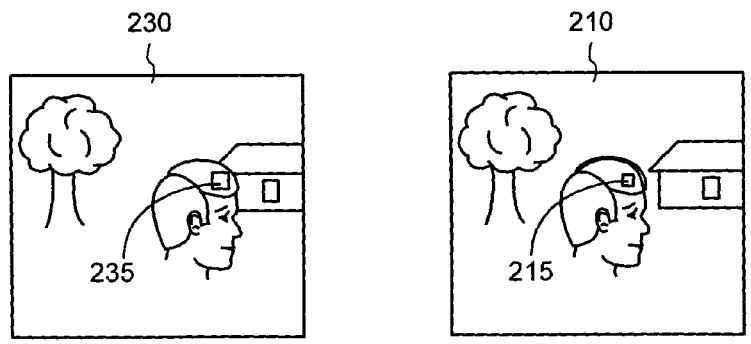

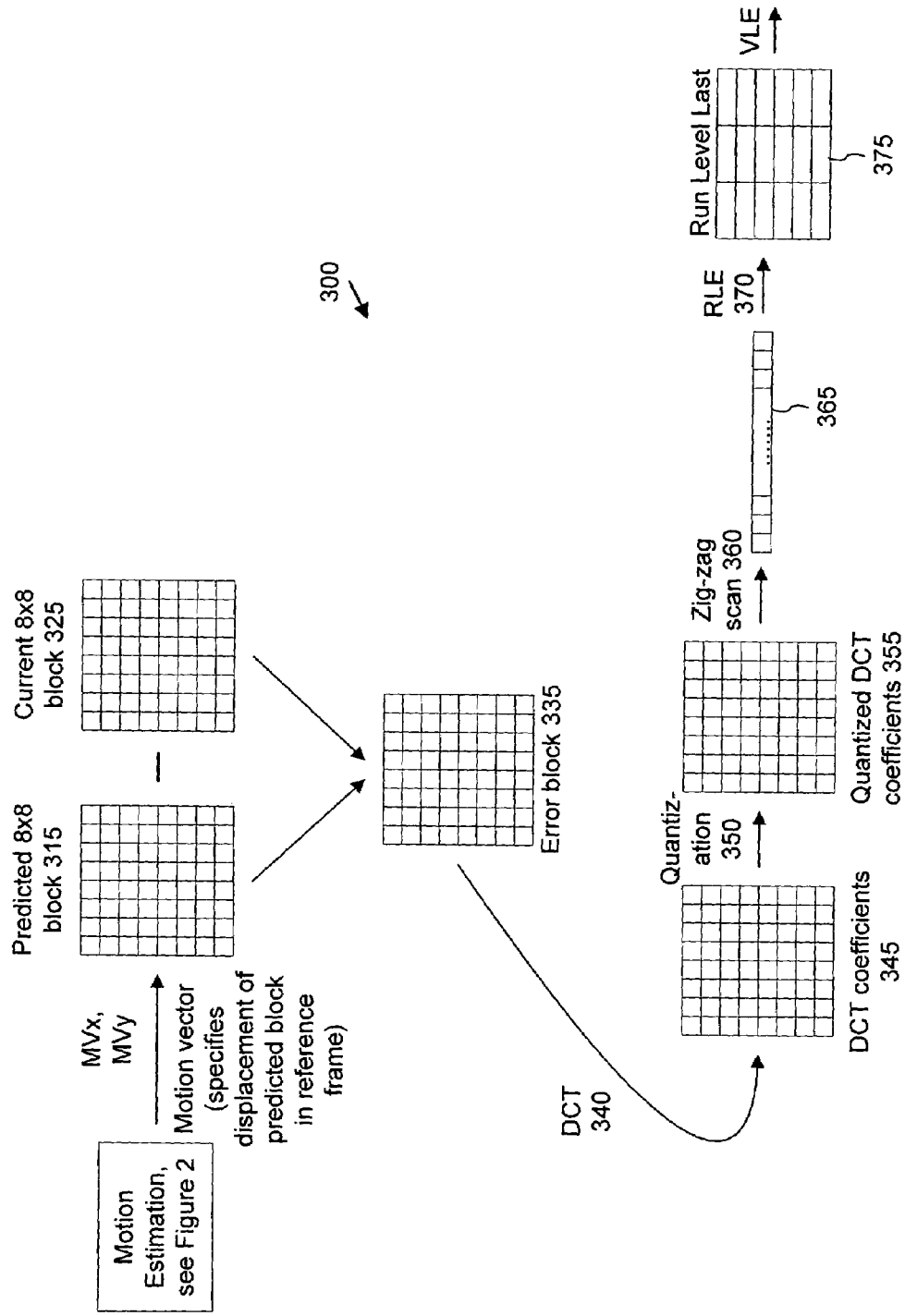

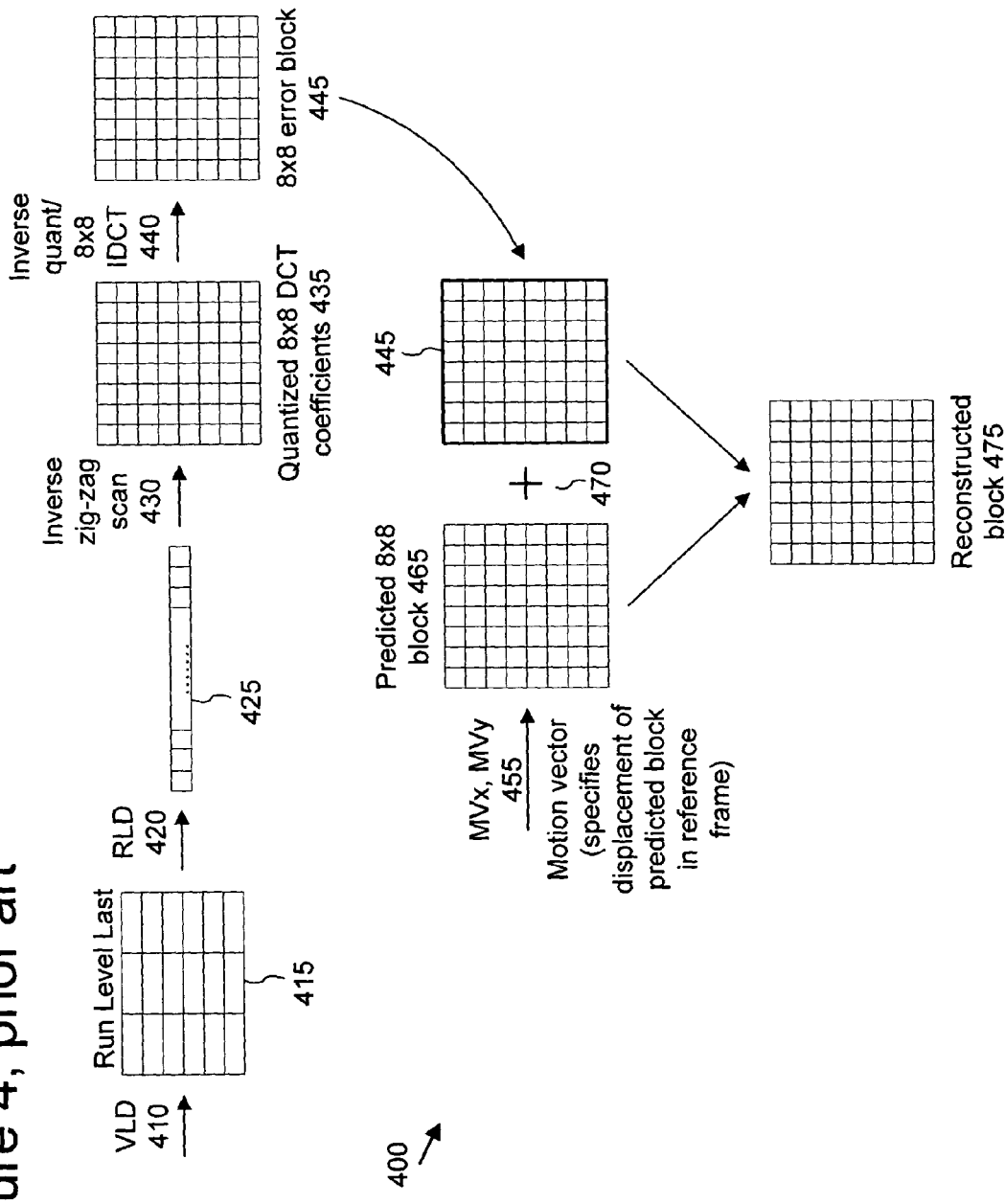
Figure 4, prior art

Software 780 implementing video encoder or decoder

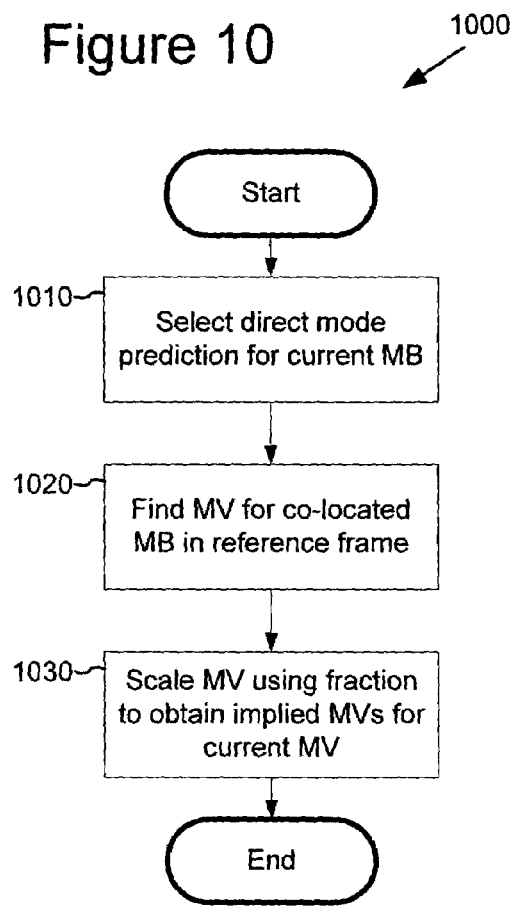
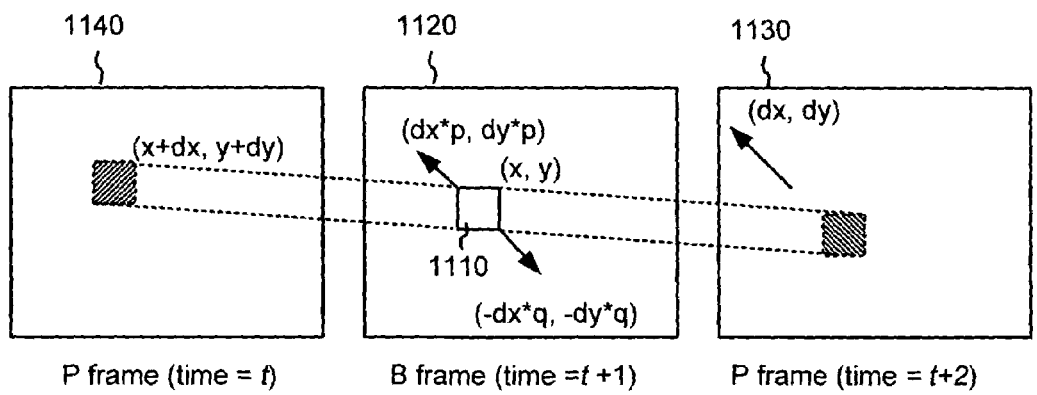

ADVANCED BI-DIRECTIONAL PREDICTIVE CODING OF VIDEO FRAMES

RELATED APPLICATION INFORMATION

The following co-pending U.S. patent applications relate to the present application and are hereby incorporated herein by reference: 1) U.S. patent application Ser. No. 10/382,311, entitled, "Sub-Pixel Interpolation in Motion Estimation and Compensation," filed Mar. 4, 2003; 2) U.S. patent application Ser. No. 10/321,415, entitled, "Skip Macroblock Coding," filed Dec. 16, 2002; 3) U.S. patent application Ser. No. 12/275,782, entitled, "Coding of Motion Vector Information," filed concurrently herewith; and 4) U.S. patent application Ser. No. 10/622,284 entitled, "Intraframe and Interframe Interlace Coding and Decoding," filed concurrently herewith.

COPYRIGHT AUTHORIZATION

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

TECHNICAL FIELD

Techniques and tools for predictive coding/decoding of video frames are described. For example, a video encoder uses described techniques and tools for coding/decoding bi-directionally predicted frames (B-frames).

BACKGROUND

Digital video consumes large amounts of storage and transmission capacity. A typical raw digital video sequence includes 15 or 30 frames per second. Each frame can include tens or hundreds of thousands of pixels (also called pels). Each pixel represents a tiny element of the picture. In raw form, a computer commonly represents a pixel with 24 bits. Thus, the number of bits per second, or bit rate, of a typical raw digital video sequence can be 5 million bits/second or more.

Most computers and computer networks lack the resources to process raw digital video. For this reason, engineers use compression (also called coding or encoding) to reduce the bit rate of digital video. Compression can be lossless, in which quality of the video does not suffer but decreases in bit rate are limited by the complexity of the video. Or, compression can be lossy, in which quality of the video suffers but decreases in bit rate are more dramatic. Decompression reverses compression.

In general, video compression techniques include intraframe compression and interframe compression. Intraframe compression techniques compress individual frames, typically called I-frames or key frames. Interframe compression techniques compress frames with reference to preceding and/or following frames, which are typically called predicted frames, P-frames, or B-frames.

Microsoft Corporation's Windows Media Video, Version 8 ["WMV8"] includes a video encoder and a video decoder. The WMV8 encoder uses intraframe and interframe compression, and the WMV8 decoder uses intraframe and interframe decompression.

A. Intraframe Compression in WMV8

FIG. 1 shows an example of block-based intraframe compression 100 of a block 105 of pixels in a key frame in the WMV8 encoder. For example, the WMV8 encoder splits a key video frame into 8×8 blocks of pixels and applies an 8×8 discrete cosine transform ["DCT"] 110 to individual blocks, converting the 8×8 block of pixels 105 into an 8×8 block of DCT coefficients 115. The encoder quantizes 120 the DCT coefficients, resulting in an 8×8 block of quantized DCT coefficients 125 which the encoder then prepares for entropy encoding.

The encoder encodes the DC coefficient 126 as a differential from the DC coefficient 136 of a previously encoded neighbor (e.g., neighbor block 135) of the block being encoded. The encoder entropy encodes the differential 140. FIG. 1 shows the left column 127 of AC coefficients encoded as a differential 147 from the left column 137 of the neighboring (to the left) block 135. The remaining AC coefficients are from the block 125 of quantized DCT coefficients.

The encoder scans 150 the 8×8 block 145 of predicted, quantized AC DCT coefficients into a one-dimensional array 155 and then entropy encodes the scanned AC coefficients using a variation of run length coding 160. The encoder selects an entropy code from one or more run/level/last tables 165 and outputs the entropy code 170.

B. Interframe Compression in WMV8

Interframe compression in the WMV8 encoder uses block-based motion compensated prediction coding followed by transform coding of the residual error. FIGS. 2 and 3 illustrate the block-based interframe compression for a predicted frame in the WMV8 encoder. In particular, FIG. 2 illustrates motion estimation for a predicted frame 210 and FIG. 3 illustrates compression of a prediction residual for a motion-estimated block of a predicted frame.

For example, the WMV8 encoder splits a predicted frame into 8×8 blocks of pixels. Groups of four 8×8 blocks form macroblocks. For each macroblock, a motion estimation process is performed. The motion estimation approximates the motion of the macroblock of pixels relative to a reference frame, for example, a previously coded, preceding frame. In FIG. 2, the WMV8 encoder computes a motion vector for a macroblock 215 in the predicted frame 210. To compute the motion vector, the encoder searches in a search area 235 of a reference frame 230. Within the search area 235, the encoder compares the macroblock 215 from the predicted frame 210 to various candidate macroblocks in order to find a candidate macroblock that is a good match. After the encoder finds a good matching macroblock, the encoder outputs information specifying the motion vector (entropy coded) for the matching macroblock so the decoder can find the matching macroblock during decoding. When decoding the predicted frame 210 with motion compensation, a decoder uses the motion vector to compute a prediction macroblock for the macroblock 215 using information from the reference frame 230. The prediction for the macroblock 215 is rarely perfect, so the encoder usually encodes 8×8 blocks of pixel differences (also called the error or residual blocks) between the prediction macroblock and the macroblock 215 itself.

FIG. 3 illustrates an example of computation and encoding of an error block 335 in the WMV8 encoder. The error block 335 is the difference between the predicted block 315 and the original current block 325. The encoder applies a DCT 340 to the error block 335, resulting in an 8×8 block 345 of coefficients. The encoder then quantizes 350 the DCT coefficients, resulting in an 8×8 block of quantized DCT coefficients 355.

The quantization step size is adjustable. Quantization results in loss of precision, but not complete loss of the information for the coefficients.

The encoder then prepares the 8×8 block 355 of quantized DCT coefficients for entropy encoding. The encoder scans 360 the 8×8 block 355 into a one dimensional array 365 with 64 elements, such that coefficients are generally ordered from lowest frequency to highest frequency, which typically creates long runs of zero values.

The encoder entropy encodes the scanned coefficients using a variation of run length coding 370. The encoder selects an entropy code from one or more run/level/last tables 375 and outputs the entropy code.

FIG. 4 shows an example of a corresponding decoding process 400 for an inter-coded block. Due to the quantization of the DCT coefficients, the reconstructed block 475 is not identical to the corresponding original block. The compression is lossy.

In summary of FIG. 4, a decoder decodes (410, 420) entropy-coded information representing a prediction residual using variable length decoding 410 with one or more run/level/last tables 415 and run length decoding 420. The decoder inverse scans 430 a one-dimensional array 425 storing the entropy-decoded information into a two-dimensional block 435. The decoder inverse quantizes and inverse discrete cosine transforms (together, 440) the data, resulting in a reconstructed error block 445. In a separate motion compensation path, the decoder computes a predicted block 465 using motion vector information 455 for displacement from a reference frame. The decoder combines 470 the predicted block 465 with the reconstructed error block 445 to form the reconstructed block 475.

The amount of change between the original and reconstructed frame is termed the distortion and the number of bits required to code the frame is termed the rate for the frame. The amount of distortion is roughly inversely proportional to the rate. In other words, coding a frame with fewer bits (greater compression) will result in greater distortion, and vice versa.

C. Limitations of Conventional Bi-Directional Prediction

Bi-directionally coded images (e.g., B-frames) use two images from the source video as reference (or anchor) images. For example, among anchor frames for a typical B-frame, one anchor frame is from the temporal past and one anchor frame is from the temporal future. For example, referring to FIG. 5, a B-frame 510 in a video sequence has a temporally previous reference frame 520 and a temporally future reference frame 530.

Some conventional encoders use five prediction modes (forward, backward, direct, interpolated and intra) to predict regions in a current B-frame. In intra mode, for example, an encoder intra-codes macroblocks. Intra-coded macroblocks are not predicted from either reference image. In the forward and backward modes, an encoder predicts macroblocks using one reference frame. Forward mode is for predicting macroblocks using the previous reference frame (e.g., previous reference frame 520), and backward mode is for predicting macroblocks using the future reference frame (e.g., future reference frame 530).

In the direct and interpolated modes, an encoder predicts macroblocks in a current frame using both previous reference frame 520 and future reference frame 530. For example, in interpolated mode, an encoder predicts macroblocks by averaging a prediction from the previous frame using a forward pointing motion vector and a prediction from the future frame using a backward pointing motion vector. For example, an encoder using interpolated mode to encode a macroblock predictively signals the actual forward and backward pointing motion vectors for the macroblock in the bit stream. In other words, two motion vectors are explicitly calculated for the macroblock and sent to the decoder (or receiver).

In direct mode, however, an encoder derives implied forward and backward pointing motion vectors by scaling the co-located motion vector in the future anchor frame. For example, an encoder scales the motion vector for the macroblock in the anchor frame having the same horizontal and vertical index as the macroblock currently being encoded.

FIG. 6 outlines the way in which direct mode prediction works in many prior implementations. To derive implied forward and backward motion vectors ($MV_F$ and $MV_B$, respectively) for the macroblock 610 being encoded in the B-frame 620, an encoder scales the motion vector (MV) of the corresponding macroblock in the future reference frame 630 (e.g., a P-frame) using timestamps, as follows:

$$MV_F = (TR_B * MV)/TR_D \quad (1)$$

$$MV_B = (TR_B - TR_D) * MV/TR_D \quad (2)$$

$TR_D$ is the temporal distance between the previous reference frame 640 (e.g., a P-frame) and the future reference frame 630, and $TR_B$ is the temporal distance between the current frame and previous reference frame. The encoder calculates temporal distances based on timestamps for the frames.

In the example shown in FIG. 6, $TR_D=2$ and $TR_B=1$. The encoder uses the two implied motion vectors to address macroblocks in the previous reference frame 640 and the future reference frame 630, and the average of these is used to predict the macroblock 610 being encoded. For example, in FIG. 6, $MV_F=(dx/2, dy/2)$ and $MV_B=(-dx/2, -dy/2)$.

Direct mode prediction of this nature imposes restrictions on the encoder and decoder. For example, the encoding and decoding of the bit stream is dependent on timestamps. This dependency can cause system architecture problems, because timestamps are more of a system layer primitive (e.g., in ASF or other streaming formats) than a bit stream primitive. By using absolute time stamps and true frame distances (e.g., $TR_B$ and $TR_D$), prior implementations also impose a constant velocity assumption on the motion being modeled: When this assumption is inappropriate in view of the actual motion between the two reference frames, direct mode prediction can become expensive or altogether inapplicable.

D. Standards for Video Compression and Decompression

Aside from WMV8, several international standards relate to video compression and decompression. These standards include the Motion Picture Experts Group ["MPEG"] 1, 2, and 4 standards and the H.261, H.262, and H.263 standards from the International Telecommunication Union ["ITU"]. Like WMV8, these standards use a combination of intraframe and interframe compression.

For example, the MPEG 4 standard describes bi-directional motion compensation in video object planes, including "direct" mode motion compensation, in which motion vectors for a video object plane are derived by scaling motion vectors of co-located macroblocks in temporally previous or future video object planes (such as previous or future intra-coded or inter-coded video object planes) based on time stamps.

Given the critical importance of video compression and decompression to digital video, it is not surprising that video compression and decompression are richly developed fields. Whatever the benefits of previous video compression and decompression techniques, however, they do not have the advantages of the following techniques and tools.

SUMMARY

In summary, the detailed description is directed to various techniques and tools for coding/decoding of video images. In particular, described embodiments include techniques and tools for coding/decoding B-frames. The various techniques and tools can be used in combination or independently.

In one aspect, a video encoder/decoder processing images in a sequence of video images determines a fraction for a current image in the sequence. The fraction represents an estimated temporal distance position for the current image relative to an interval between a first reference image for the current image and a second reference image for the current image. The video encoder/decoder processes the fraction along with a motion vector for the first reference image. The motion vector represents motion in the first reference image relative to a second reference image for the current image. The processing results in a representation of motion (e.g., constant velocity or variable velocity motion) in the current image relative to the first reference image.

The fraction can be represented by a variable length code in a bit stream, and can be selected from a set of fractional values. The fraction can be based on the nature of the motion in the sequence, or on the proximity of the current image to the end or beginning of the sequence. The estimated temporal position may or may not be the true temporal position of the current image. The fraction can be determined by evaluating different fractions to determine bit costs for encoding the current image using the different fractions, and selecting a fraction from among the different fractions.

In another aspect, a video encoder/decoder determines a fraction for one or more regions (e.g., slice, macroblock, etc.) of a current image in a sequence. The video encoder/decoder processes the fraction along with a motion vector for the first reference image, and the processing results in a representation of motion in one or more regions of the current image. Different fractions can be used for different regions.

In another aspect, a video encoder determines a fraction for a current image and selects direct mode prediction for a current macroblock in the current image. The encoder finds a motion vector for a co-located macroblock in a future reference image for the current image, and scales the motion vector (e.g., by scaling the vertical and horizontal components of the motion vector) for the co-located macroblock using the fraction. The encoder can scale the motion vector by a factor of fraction to obtain an implied forward motion vector for the current macroblock; and scale the motion vector by a factor of fraction−1 to obtain an implied backward motion vector for the current macroblock. The encoder can address a macroblock in the future reference frame using the implied forward motion vector, address a macroblock in the previous reference frame using the implied backward motion vector; and predict the current macroblock using an average of the macroblock in the future reference frame and the macroblock in the previous reference frame.

In another aspect, a video encoder/decoder determines a temporal position for a current image in a sequence, independent of time stamps. The encoder/decoder processes the current image based on the temporal position of the current image and a motion vector for the first at least one reference image. The processing results in a representation of motion in the current image. The determination of the temporal position can be based on a fixed inter-frame distance and a fixed number of images with plural references within the sequence of video images.

In another aspect, an encoder encodes a current image by analyzing reference images for the current image along with the current image to determine whether the current image is to be predictively encoded based on the reference images. The encoder encodes the current image independently from the reference images, based on the analysis. The encoder assigns an image type (e.g., B/I or intra B) to the current image (e.g., in the form of a variable length code from a variable length coding table). The image type indicates that the current image is encoded independently from the reference images. The encoder can designate the image as a non-reference image.

In another aspect, a video decoder decodes a current image in an encoded video image sequence by receiving an image type (e.g., B/I or intra B) for the current image, which indicates that the current image is encoded independently from its reference images. The decoder analyzes bit rate constraints and determines whether to omit the current image from the decoded video stream based on the analysis and the image type for the current image. The decoder can maintain a bias in favor of omitting the current image relative to encoded images having different frame types.

In another aspect, an encoder/decoder processes a bit plane for a bi-directionally predicted video image. The bit plane comprises binary information signifying whether macroblocks in the bi-directionally predicted video image are encoded using direct mode prediction or non-direct mode prediction.

In another aspect, an encoder/decoder processing images in a sequence by determining a value representing a forward motion vector component for a current image and determining a value representing a backward motion vector component for the current image. The encoder/decoder adds the value representing the forward motion vector to a forward buffer and adds the value representing the backward motion vector to a backward buffer. The values in the forward buffer and backward buffer are used to predict motion vectors for macroblocks in the current frame.

In another aspect, a video encoder estimates motion for a bi-directionally predicted image by selecting a motion vector resolution from among plural motion vector resolutions, selecting an interpolation filter from among plural interpolation filters, and encoding the bi-directionally predicted image using the selected motion vector resolution and the selected interpolation filter. The motion vector resolutions can include a half-pixel resolution and a quarter pixel resolution. The interpolation can include a bicubic interpolation filter and a bilinear interpolation filter. The bi-directionally predicted image can be limited to using only one motion vector per macroblock for motion estimation. The encoder can apply a four-motion-vector to one-motion-vector conversion to a macroblock in a reference image if the macroblock in the reference image has four motion vectors. The conversion can include determining the median of four vertical motion vector components, determining the median of four horizontal motion vector components, and determining a median motion vector based on the median vertical and horizontal components.

Motion vector modes for a bi-directionally predicted image can include a one motion vector, quarter-pixel resolution, bicubic interpolation filter mode; a one motion vector, half-pixel resolution, bicubic interpolation filter mode; and a one motion vector, half-pixel resolution, bilinear interpolation filter mode. A mode can be selected based on an efficiency evaluation of encoding the bi-directionally predicted image using one or more of the motion vector modes.

In another aspect, an encoder/decoder monitors bits used during processing of images in a video sequence. Based on the monitoring (e.g., comparing bits used with a threshold, which can be adaptively adjusted), the encoder/decoder determines, at a time when enough bit rate remains for the encoder/decoder to process a current image having two reference images, whether to drop (or omit) the current image from the processed video image sequence. The determination can be based on a comparison of the number of bits required to process the current image with a number of bits available for use prior to processing the current image. The determination can be performed at frame level.

In another aspect, a video encoder/decoder determines whether to omit a current image having two reference images from a processed sequence in the following manner: if more than half of n images processed prior to the current image were omitted, then omit the current image if the number of bits required to process the current image is greater than the average bits per image used to process the prior n images. If half or less than half of the prior n images were omitted, then omit the current image if the number of bits required to process the current image is greater than the twice the average bits per image used to process the prior n images.

In another aspect, an encoder omits a predicted image from an encoded video image sequence and represents the omitted image with a frame-level indicator in the bit stream. The frame-level indicator indicates the omitted predicted image to a decoder. The frame-level indicator can be data having an indicator size, where the size (e.g., a size smaller than the minimum size for an encoded image) indicates the omitted predicted image. The frame-level indicator can cause the video decoder to reassess which images in the sequence are the reference images for a predicted image (e.g., a B-frame that originally had a dropped P-frame as a reference frame).

Additional features and advantages will be made apparent from the following detailed description of different embodiments that proceeds with reference to the accompanying drawings.

BRIEF DESCRIPTION OF THE DRAWINGS

FIG. 1 is a diagram showing block-based intraframe compression of an 8×8 block of pixels according to the prior art.

FIG. 2 is a diagram showing motion estimation in a video encoder according to the prior art.

FIG. 3 is a diagram showing block-based interframe compression for an 8×8 block of prediction residuals in a video encoder according to the prior art.

FIG. 4 is a diagram showing block-based interframe decompression for an 8×8 block of prediction residuals in a video encoder according to the prior art.

FIG. 10 is a flow chart showing a technique for scaling a co-located motion vector to obtain implied motion vectors in direct mode prediction.

FIG. 11 shows direct mode motion prediction using fraction coding (p+q=1) as a variable velocity projection of macroblock motion at time=t+2.

DETAILED DESCRIPTION

The present application relates to techniques and tools for predictive coding of video images (e.g., frames). In various described embodiments, a video encoder and decoder incorporate techniques that improve the efficiency of bi-directional predictive coding and decoding of video images (e.g., B-frames), and a bit stream format or syntax includes flags and other codes to incorporate the techniques. The bit stream format comprises different layers or levels (e.g., sequence level, frame/picture/image level, macroblock level, and/or block level).

Described embodiments use direct mode prediction in which the time-stamp dependency of conventional implementations is eliminated. For example, in some embodiments, a video encoder uses a fraction to encode a B-frame's temporal position relative to a reference frame. This direct mode prediction model shifts from a constant velocity model to variable velocity model to more closely align it with the kind of motion that is actually present in a typical frame sequence. Encoding an increased percentage of macroblocks in direct mode allows B-frames to derive a greater benefit from the direct mode features, thereby reducing bit rate. Described embodiments reduce overhead when signaling direct mode by, for example, coding macroblock-level direct mode information as a compressed bit plane.

Described embodiments also include techniques and tools for coding motion vectors efficiently, for using a selection of interpolation filters and varying motion vector resolutions, for proactively dropping B-frames under one-pass constant bit rate coding, and for signaling dropped P-frames (e.g., P-frames from which B-frames may depend).

The various techniques and tools can be used in combination or independently. Different embodiments implement one or more of the described techniques and tools.

I. Computing Environment

Figure 5:
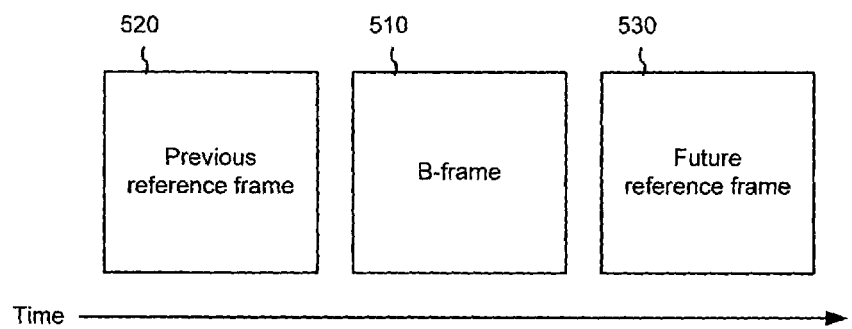
FIG. 5 shows a B-frame with past and future reference frames according to the prior art.
Figure 6:
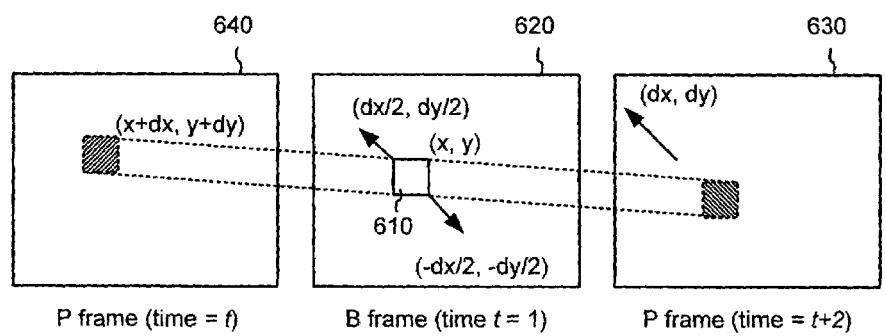
FIG. 6 shows direct mode motion prediction in a B-frame using timestamps as a constant velocity projection of macroblock motion at time=t+2 according to the prior art.
Figure 7:
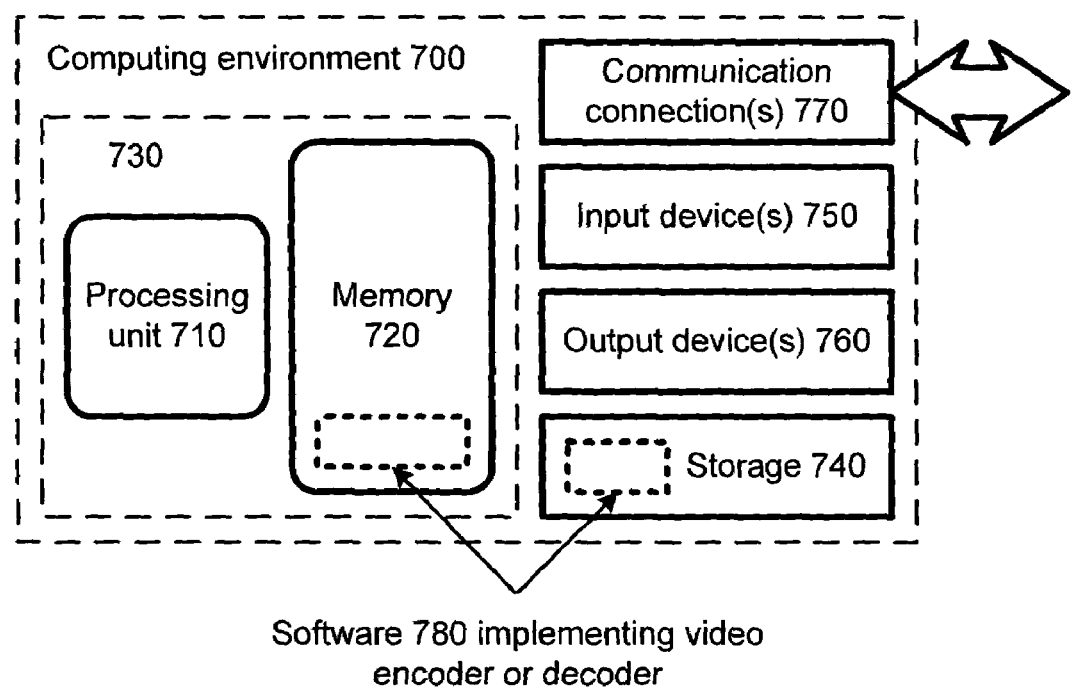
FIG. 7 is a block diagram of a suitable computing environment in which several described embodiments may be implemented.

FIG. 7 illustrates a generalized example of a suitable computing environment 700 in which several of the described embodiments may be implemented. The computing environment 700 is not intended to suggest any limitation as to scope of use or functionality, as the techniques and tools may be implemented in diverse general-purpose or special-purpose computing environments.

With reference to FIG. 7, the computing environment 700 includes at least one processing unit 710 and memory 720. In FIG. 7, this most basic configuration 730 is included within a dashed line. The processing unit 710 executes computer-executable instructions and may be a real or a virtual processor. In a multi-processing system, multiple processing units execute computer-executable instructions to increase processing power. The memory 720 may be volatile memory (e.g., registers, cache, RAM), non-volatile memory (e.g., ROM, EEPROM, flash memory, etc.), or some combination of the two. The memory 720 stores software 780 implementing a video encoder or decoder.

A computing environment may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The storage 740 may be removable or non-removable, and includes magnetic disks, magnetic tapes or cassettes, CD-ROMs, DVDs, or any other medium which can be used to store information and which can be accessed within the computing environment 700. The storage 740 stores instructions for the software 780 implementing the video encoder or decoder.

The input device(s) 750 may be a touch input device such as a keyboard, mouse, pen, or trackball, a voice input device, a scanning device, or another device that provides input to the computing environment 700. For audio or video encoding, the input device(s) 750 may be a sound card, video card, TV tuner card, or similar device that accepts audio or video input in analog or digital form, or a CD-ROM or CD-RW that reads audio or video samples into the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment 700, computer-readable media include memory 720, storage 740, communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "estimate," "choose," "compensate," and "apply" to describe computer operations in a computing environment. These terms are high-level abstractions for operations performed by a computer, and should not be confused with acts performed by a human being. The actual computer operations corresponding to these terms vary depending on implementation.

II. Generalized Video Encoder and Decoder

Figure 8:
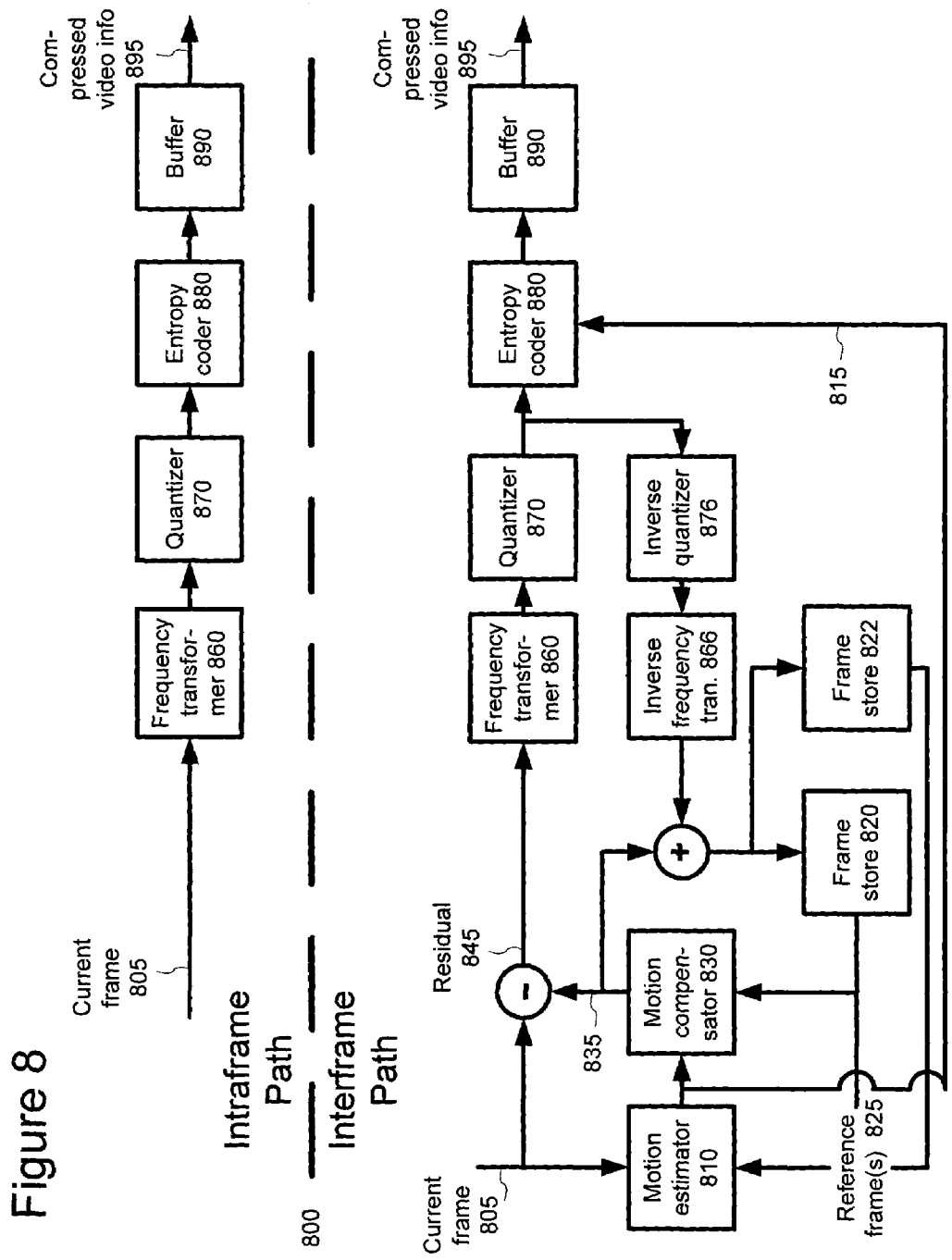
FIG. 8 is a block diagram of a generalized video encoder system used in several described embodiments.
Figure 9:
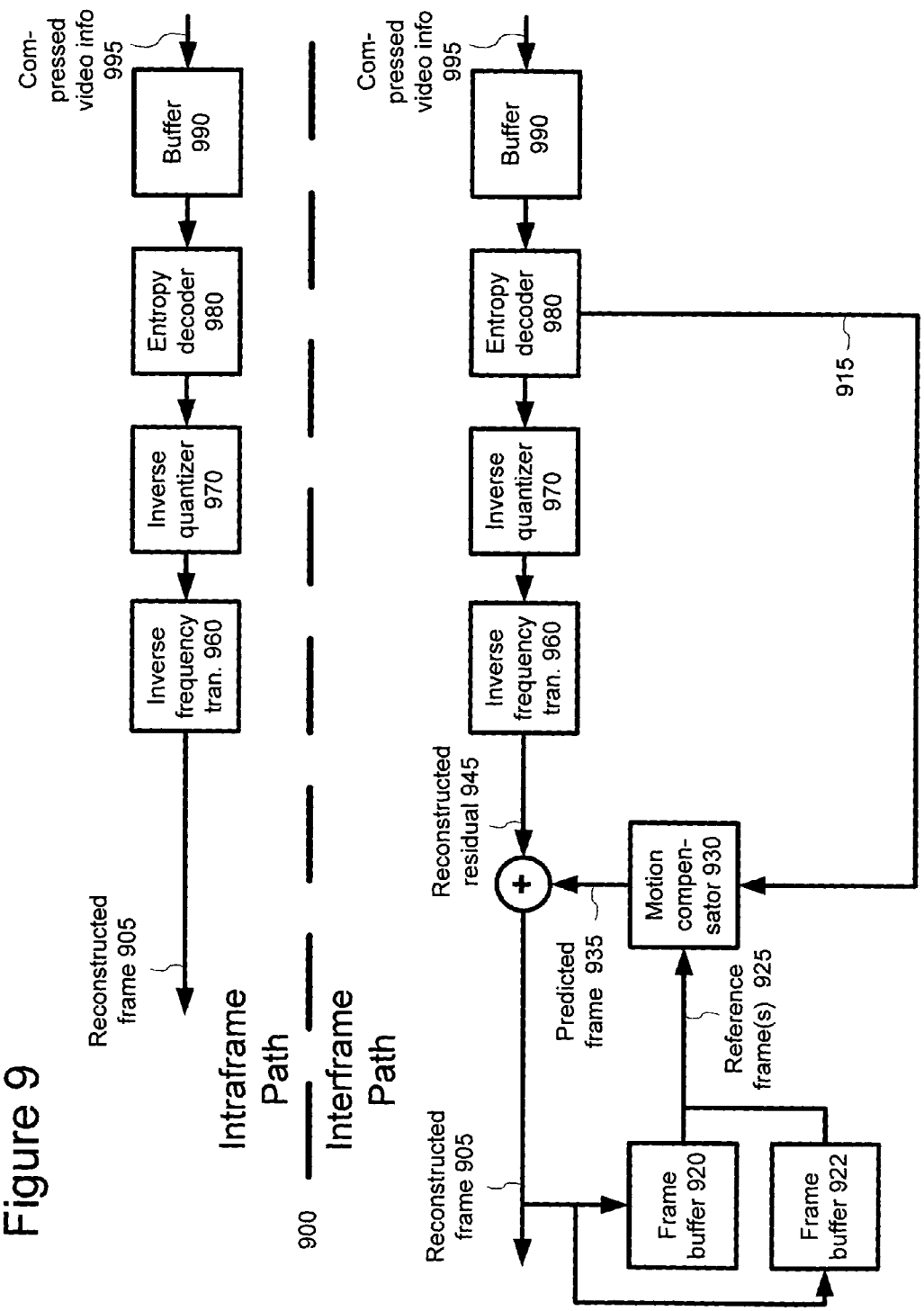
FIG. 9 is a block diagram of a generalized video decoder system used in several described embodiments.

FIG. 8 is a block diagram of a generalized video encoder 800 and FIG. 9 is a block diagram of a generalized video decoder 900.

The relationships shown between modules within the encoder and decoder indicate the main flow of information in the encoder and decoder; other relationships are not shown for the sake of simplicity. In particular, FIGS. 8 and 9 generally do not show side information indicating the encoder settings, modes, tables, etc. used for a video sequence, frame, macroblock, block, etc. Such side information is sent in the output bit stream, typically after entropy encoding of the side information. The format of the output bit stream can be a Windows Media Video format or another format.

The encoder 800 and decoder 900 are block-based and use a 4:2:0 macroblock format with each macroblock including four 8×8 luminance blocks (at times treated as one 16×16 macroblock) and two 8×8 chrominance blocks. Alternatively, the encoder 800 and decoder 900 are object-based, use a different macroblock or block format, or perform operations on sets of pixels of different size or configuration than 8×8 blocks and 16×16 macroblocks.

Depending on implementation and the type of compression desired, modules of the encoder or decoder can be added, omitted, split into multiple modules, combined with other modules, and/or replaced with like modules. In alternative embodiments, encoder or decoders with different modules and/or other configurations of modules perform one or more of the described techniques.

A. Video Encoder

FIG. 8 is a block diagram of a general video encoder system 800. The encoder system 800 receives a sequence of video frames including a current frame 805, and produces compressed video information 895 as output. Particular embodiments of video encoders typically use a variation or supplemented version of the generalized encoder 800.

The encoder system 800 compresses predicted frames and key frames. For the sake of presentation, FIG. 8 shows a path for key frames through the encoder system 800 and a path for predicted frames. Many of the components of the encoder system 800 are used for compressing both key frames and predicted frames. The exact operations performed by those components can vary depending on the type of information being compressed.

A predicted frame (also called P-frame, B-frame for bi-directional prediction, or inter-coded frame) is represented in terms of prediction (or difference) from one or more reference (or anchor) frames. A prediction residual is the difference between what was predicted and the original frame. In contrast, a key frame (also called I-frame, intra-coded frame) is compressed without reference to other frames. Other frames also can be compressed without reference to other frames. For example, an intra B-frame (or B/I-frame), while not a true key frame, is also compressed without reference to other frames.

If the current frame 805 is a forward-predicted frame, a motion estimator 810 estimates motion of macroblocks or other sets of pixels of the current frame 805 with respect to a reference frame, which is the reconstructed previous frame 825 buffered in a frame store (e.g., frame store 820). If the current frame 805 is a bi-directionally-predicted frame (a B-frame), a motion estimator 810 estimates motion in the current frame 805 with respect to two reconstructed reference frames. Typically, a motion estimator estimates motion in a B-frame with respect to a temporally previous reference frame and a temporally future reference frame. Accordingly, the encoder system 800 can comprise separate stores 820 and 822 for backward and forward reference frames.

The motion estimator 810 can estimate motion by pixel, ½ pixel, ¼ pixel, or other increments, and can switch the resolution of the motion estimation on a frame-by-frame basis or other basis. The resolution of the motion estimation can be the same or different horizontally and vertically. The motion estimator 810 outputs as side information motion information 815 such as motion vectors. A motion compensator 830 applies the motion information 815 to the reconstructed frame(s) 825 to form a motion-compensated current frame 835. The prediction is rarely perfect, however, and the difference between the motion-compensated current frame 835 and the original current frame 805 is the prediction residual 845. Alternatively, a motion estimator and motion compensator apply another type of motion estimation/compensation.

A frequency transformer 860 converts the spatial domain video information into frequency domain (i.e., spectral) data. For block-based video frames, the frequency transformer 860 applies a discrete cosine transform ["DCT"] or variant of DCT to blocks of the pixel data or prediction residual data, producing blocks of DCT coefficients. Alternatively, the frequency transformer 860 applies another conventional frequency transform such as a Fourier transform or uses wavelet or subband analysis. If the encoder uses spatial extrapolation (not shown in FIG. 8) to encode blocks of key frames, the frequency transformer 860 can apply a re-oriented frequency transform such as a skewed DCT to blocks of prediction residuals for the key frame. In some embodiments, the frequency transformer 860 applies an 8×8, 8×4, 4×8, or other size frequency transforms (e.g., DCT) to prediction residuals for predicted frames.

A quantizer 870 then quantizes the blocks of spectral data coefficients. The quantizer applies uniform, scalar quantization to the spectral data with a step-size that varies on a frame-by-frame basis or other basis. Alternatively, the quantizer applies another type of quantization to the spectral data coefficients, for example, a non-uniform, vector, or non-adaptive quantization, or directly quantizes spatial domain data in an encoder system that does not use frequency transformations. In addition to adaptive quantization, the encoder 800 can use frame dropping, adaptive filtering, or other techniques for rate control.

If a given macroblock in a predicted frame has no information of certain types (e.g., no motion information for the macroblock and no residual information), the encoder 800 may encode the macroblock as a skipped macroblock. If so, the encoder signals the skipped macroblock in the output bit stream of compressed video information 895.

When a reconstructed current frame is needed for subsequent motion estimation/compensation, an inverse quantizer 876 performs inverse quantization on the quantized spectral data coefficients. An inverse frequency transformer 866 then performs the inverse of the operations of the frequency transformer 860, producing a reconstructed prediction residual (for a predicted frame) or a reconstructed key frame. If the current frame 805 was a key frame, the reconstructed key frame is taken as the reconstructed current frame (not shown). If the current frame 805 was a predicted frame, the reconstructed prediction residual is added to the motion-compensated current frame 835 to form the reconstructed current frame. A frame store (e.g., frame store 820) buffers the reconstructed current frame for use in predicting another frame. In some embodiments, the encoder applies a deblocking filter to the reconstructed frame to adaptively smooth discontinuities in the blocks of the frame.

The entropy coder 880 compresses the output of the quantizer 870 as well as certain side information (e.g., motion information 815, spatial extrapolation modes, quantization step size). Typical entropy coding techniques include arithmetic coding, differential coding, Huffman coding, run length coding, LZ coding, dictionary coding, and combinations of the above. The entropy coder 880 typically uses different coding techniques for different kinds of information (e.g., DC coefficients, AC coefficients, different kinds of side information), and can choose from among multiple code tables within a particular coding technique.

The entropy coder 880 puts compressed video information 895 in the buffer 890. A buffer level indicator is fed back to bit rate adaptive modules.

The compressed video information 895 is depleted from the buffer 890 at a constant or relatively constant bit rate and stored for subsequent streaming at that bit rate. Therefore, the level of the buffer 890 is primarily a function of the entropy of the filtered, quantized video information, which affects the efficiency of the entropy coding. Alternatively, the encoder system 800 streams compressed video information immediately following compression, and the level of the buffer 890 also depends on the rate at which information is depleted from the buffer 890 for transmission.

Before or after the buffer 890, the compressed video information 895 can be channel coded for transmission over the network. The channel coding can apply error detection and correction data to the compressed video information 895.

B. Video Decoder

FIG. 9 is a block diagram of a general video decoder system 900. The decoder system 900 receives information 995 for a compressed sequence of video frames and produces output including a reconstructed frame 905. Particular embodiments of video decoders typically use a variation or supplemented version of the generalized decoder 900.

The decoder system 900 decompresses predicted frames and key frames. For the sake of presentation, FIG. 9 shows a path for key frames through the decoder system 900 and a path for predicted frames. Many of the components of the decoder system 900 are used for decompressing both key frames and predicted frames. The exact operations performed by those components can vary depending on the type of information being decompressed.

A buffer 990 receives the information 995 for the compressed video sequence and makes the received information available to the entropy decoder 980. The buffer 990 typically receives the information at a rate that is fairly constant over time, and includes a jitter buffer to smooth short-term variations in bandwidth or transmission. The buffer 990 can include a playback buffer and other buffers as well. Alternatively, the buffer 990 receives information at a varying rate. Before or after the buffer 990, the compressed video information can be channel decoded and processed for error detection and correction.

The entropy decoder 980 entropy decodes entropy-coded quantized data as well as entropy-coded side information (e.g., motion information 915, spatial extrapolation modes, quantization step size), typically applying the inverse of the entropy encoding performed in the encoder. Entropy decoding techniques include arithmetic decoding, differential decoding, Huffman decoding, run length decoding, LZ decoding, dictionary decoding, and combinations of the above. The entropy decoder 980 frequently uses different decoding techniques for different kinds of information (e.g., DC coefficients, AC coefficients, different kinds of side information), and can choose from among multiple code tables within a particular decoding technique.

A motion compensator 930 applies motion information 915 to one or more reference frames 925 to form a prediction 935 of the frame 905 being reconstructed. For example, the motion compensator 930 uses a macroblock motion vector to find a macroblock in a reference frame 925. A frame buffer (e.g., frame buffer 920) stores previously reconstructed frames for use as reference frames. Typically, B-frames have more than one reference frame (e.g., a temporally previous reference frame and a temporally future reference frame).

Accordingly, the decoder system 900 can comprise separate frame buffers 920 and 922 for backward and forward reference frames.

The motion compensator 930 can compensate for motion at pixel, ½ pixel, ¼ pixel, or other increments, and can switch the resolution of the motion compensation on a frame-by-frame basis or other basis. The resolution of the motion compensation can be the same or different horizontally and vertically. Alternatively, a motion compensator applies another type of motion compensation. The prediction by the motion compensator is rarely perfect, so the decoder 900 also reconstructs prediction residuals.

When the decoder needs a reconstructed frame for subsequent motion compensation, a frame buffer (e.g., frame buffer 920) buffers the reconstructed frame for use in predicting another frame. In some embodiments, the decoder applies a deblocking filter to the reconstructed frame to adaptively smooth discontinuities in the blocks of the frame.

An inverse quantizer 970 inverse quantizes entropy-decoded data. In general, the inverse quantizer applies uniform, scalar inverse quantization to the entropy-decoded data with a step-size that varies on a frame-by-frame basis or other basis. Alternatively, the inverse quantizer applies another type of inverse quantization to the data, for example, a non-uniform, vector, or non-adaptive quantization, or directly inverse quantizes spatial domain data in a decoder system that does not use inverse frequency transformations.

An inverse frequency transformer 960 converts the quantized, frequency domain data into spatial domain video information. For block-based video frames, the inverse frequency transformer 960 applies an inverse DCT ["IDCT"] or variant of IDCT to blocks of the DCT coefficients, producing pixel data or prediction residual data for key frames or predicted frames, respectively. Alternatively, the frequency transformer 960 applies another conventional inverse frequency transform such as a Fourier transform or uses wavelet or subband synthesis. If the decoder uses spatial extrapolation (not shown in FIG. 9) to decode blocks of key frames, the inverse frequency transformer 960 can apply a re-oriented inverse frequency transform such as a skewed IDCT to blocks of prediction residuals for the key frame. In some embodiments, the inverse frequency transformer 960 applies an 8×8, 8×4, 4×8, or other size inverse frequency transforms (e.g., IDCT) to prediction residuals for predicted frames.

When a skipped macroblock is signaled in the bit stream of information 995 for a compressed sequence of video frames, the decoder 900 reconstructs the skipped macroblock without using the information (e.g., motion information and/or residual information) normally included in the bit stream for non-skipped macroblocks.

III. Bi-Directional Predictive Encoding and Decoding

Described embodiments include techniques and tools for coding and decoding video images having plural reference images. For example, described embodiments include techniques and tools for coding and decoding bi-directionally predicted video frames (known as B-frames) which can exploit temporal redundancy between frames to achieve compression.

B-frames typically have two reference (or anchor) frames (e.g., one anchor frame from the temporal past and one from the temporal future) of the source video. Whereas P-frames have only one mode of prediction (e.g., forward prediction from previous I- or P-frames), B-frames can be predicted using five different prediction modes: forward, backward, direct, interpolated and intra. These modes are selected and signaled in the bit stream at macroblock level or some other level. The anchors for a B-frame are usually transmitted to the decoder (or receiver) prior to transmitting the B-frame, but in some cases, B-frames can be transmitted out-of-order.

Although it is possible to use B-frames as references for subsequent predicted frames, when B-frames used as non-reference frames, a decoder can choose to discard B-frames and still be able to decode all other frames, thereby providing useable video, albeit at a lower frame rate, to the observer. Use of B-frames also provides benefits for efficient compression in terms of greater bit rate economy (e.g., in the presence of certain types movement, such as occlusion). Estimates for rate-distortion improvement using B-frames range from 0 through 30%, with some estimates narrowing the range from 10% to 20%. In other words, some estimates indicate that an encoded bit stream with B-frames uses 80% to 90% of the bits used by an encoded bit stream with no B-frames, while providing similar visual quality. This translates into more options and flexibility when used in a small device space. For example, space and time restrictions can be accommodated by having the option of not decoding or displaying B-frames.

Various features of the described embodiments can be used in combination or independently. These features include, but are not limited to:

1. Fraction coding the temporal position of B-frames relative to their reference frames. Fraction coding effectively removes time-stamp dependency and allows video sequences with variable-velocity motion to be coded accurately and efficiently. Scaling of motion vectors uses integer operations and avoids division (to reduce computation time).
2. Intra-coded B-frames (B/I-frames).
3. Coding macroblock-level direct/non-direct mode information as a compressed bit plane, and signaling particular non-direct motion prediction modes (e.g., forward, backward, or interpolated mode) using a variable length code (VLC). The motion prediction mode VLC is designed to preferentially encode the forward or backward motion prediction mode (e.g., depending on the temporally closer anchor frame, as defined by the temporal position fraction).
4. Improved motion vector coding efficiency, including motion vector prediction based on a "forward predicts forward, backward predicts backward" rule. This involves buffering forward and backward components of motion vectors separately, including forward and backward components of direct mode implied motion vectors.
5. Permitting use of a selection of filters and motion vector resolutions for encoding B-frames. A four-motion-vector to one-motion-vector conversion can be used in cases where some macroblocks in an anchor frame are predicted using four motion vectors.
6. Proactively dropping B-frames under one-pass constant bit rate (CBR) encoding/decoding to reduce runs of consecutively dropped frames and maintain visual quality.
7. Indicating dropped P-frames by null stuffing in the bit stream.

Several features (e.g., 1, 3, 4 and 5 above) are based on an observation that, among the available prediction modes, direct mode is a powerful tool for decreasing the cost in bits of coding B-frames. Described embodiments are therefore geared to improve the benefit and reduce the cost of direct mode even further, attaching an appropriate positive bias in favor of choosing direct mode when coding B-frames.

A. Using Direct Mode Prediction to Control Bit Rate

As explained above, described embodiments predict B-frames using five different prediction modes to predict macroblocks within the B-frame: forward, backward, direct, interpolated and intra. Of these modes, direct mode prediction is an important tool in controlling bit rate. For macroblocks encoded in direct mode, encoders do not encode or send motion vectors. Therefore, direct mode prediction can lead to bit savings, especially if a) an encoder encodes a large percentage of macroblocks in B-frames using direct mode; b) an encoder efficiently encodes direct mode signaling overhead; and c) direct mode prediction is appropriate for the kind of motion that is actually present in a frame sequence. (If it isn't appropriate, large residuals or error signals can result, which would make it uneconomical to use the direct mode.) When b) and c) are true, a) becomes more desirable, and B-frames can derive more benefit from direct mode prediction to reduce bit costs.

B. Timestamp Independence in Direct Mode Prediction

Timestamp-dependent direct mode prediction can cause system architecture problems, can lead to timestamp rollover problems (e.g., where a timestamp has an insufficient number bits to properly represent a time instance) and limits flexibility in motion modeling (e.g., by imposing a constant velocity assumption on the motion being modeled). Described embodiments address these problems by removing timestamp dependency in direct mode prediction. For example, a video encoder encodes B-frames without dependence on timestamps by explicitly coding a temporal position for a B-frame as a fraction of the distance between its two reference frames. In some embodiments, in direct prediction mode, an encoder can scale a motion vector for a co-located macroblock in a reference frame and obtain implied motion forward and backward vectors for a macroblock in a current B-frame.

FIG. 10 is a flow chart showing a technique 1000 for scaling a co-located motion vector to obtain implied motion vectors in direct mode prediction. At 1010, an encoder selects direct mode prediction for a current macroblock. At 1020, the encoder finds a motion vector for a co-located macroblock in a reference frame. Then, at 1030, the encoder scales the motion vector the co-located macroblock using a fraction, and obtains implied motion vectors (forward and backward) for the current macroblock.

Table 1 shows VLCs for fractions that can be sent with B-frames in described embodiments. BFRACTION signals a fraction that can take on a limited set of discrete values between 0 and 1, denoting the relative temporal position of the B-frame within the interval formed by its anchors. There is no restriction on the uniqueness of BFRACTION among B-frames between the same two anchors. For example, different B-frames with identical anchor frames may have the same BFRACTION value. In some embodiments, the code words 000 through 110 are known as the "short" code words, and the others are known as the "long" code words.

TABLE 1

| BFRACTION VLC Table | | | | | |
|---|---|---|---|---|---|
| BFRACTION VLC | Fraction | BFRACTION VLC | Fraction | BFRACTION VLC | Fraction |
| 000 | 1/2 | 1110000 | 3/5 | 1110111 | 4/7 |
| 001 | 1/3 | 1110001 | 4/5 | 1111000 | 5/7 |
| 010 | 2/3 | 1110010 | 1/6 | 1111001 | 6/7 |
| 011 | 1/4 | 1110011 | 5/6 | 1111010 | 1/8 |
| 100 | 3/4 | 1110100 | 1/7 | 1111011 | 3/8 |
| 101 | 1/5 | 1110101 | 2/7 | 1111100 | 5/8 |
| 110 | 2/5 | 1110110 | 3/7 | 1111101 | 7/8 |

The codes in the table can be altered or rearranged to represent different fractions with different codes. Other codes also can be included in the VLC table. For example, in some embodiments, the entry 1111111 is used to encode B/I frames, which are explained in detail below. As another example, the entry 1111110 can be used to explicitly code BFRACTION in a fixed point format.

In some embodiments, an encoder uses this fraction to scale a co-located motion vector (MV), thereby deriving implied direct mode motion vectors ($MV_F$ and $MV_B$) for a B-frame. For example, an encoder scales co-located motion vectors by conceptually implementing the following scaling operations:

$$MV_F = \text{Fraction} * MV \qquad (3)$$

$$MV_B = (\text{Fraction} - 1) * MV \qquad (4)$$

FIG. 11 shows how fraction coding allows an encoder to arbitrarily scale the motion between surrounding reference frames in some embodiments. To derive implied forward and backward motion vectors ($MV_F$ and $MV_B$, respectively) for the macroblock 1110 being encoded in the B-frame 1120, an encoder scales the motion vector (MV) of the corresponding macroblock in the future reference frame 1130 (e.g., a P-frame) using fraction coding. In the example shown in FIG. 11, for the fractions p and q, p+q=1. The encoder uses the two implied motion vectors to address macroblocks in the previous reference frame 1140 and the future reference frame 1130, and the average of these is used to predict the macroblock 1110 being encoded. For example, in FIG. 11, $MV_F = (dx*p, dy*p)$ and $MV_B = (-dx*q, -dy*q)$.

An encoder can use all integer operations, avoid division, and use look up tables (LUTs) to increase the speed of these operations. For example, in some embodiments, an encoder finds a scaling factor for scaling a motion vector for a co-located macroblock, proceeding according to the following section of pseudo-code:

```
Int NumShortVLC[ ] = {1, 1, 2, 1, 3, 1, 2};
Int DenShortVLC[ ] = {2, 3, 3, 4, 4, 5, 5};
Int NumLongVLC[ ] = {3, 4, 1, 5, 1, 2, 3, 4, 5, 6, 1, 3, 5, 7};
Int DenLongVLC[ ] = {5, 5, 6, 6, 7, 7, 7, 7, 7, 7, 8, 8, 8, 8};
Int Inverse[ ] = { 256, 128, 85, 64, 51, 43, 37, 32 };
Frame_Initialization(code word)
    if (long code word) {
        Numerator = NumLongVLC[code word - 112];
        Denominator = DenLongVLC[code word - 112];
    }
    else {/* short code word */
        Numerator = NumShortVLC[code word];
        Denominator = DenShortVLC[code word];
    }
    FrameReciprocal = Inverse[Denominator - 1];
    ScaleFactor = Numerator * FrameReciprocal;
End Frame_Initialization
```

Once the scaling factor has been determined, an encoder can use the scaling factor by, for example, scaling the x- and y-elements of the motion vector for the co-located macroblock in the future reference frame. In some embodiments, the encoder proceeds according to the following pseudo-code:

```
Scale_Direct_MV (MV_X, MV_Y)
    if (Half pel units) {
        MV_X_F = 2 * ((MV_X * iScaleFactor + 255) >> 9);
        MV_Y_F = 2 * ((MV_Y * iScaleFactor + 255) >> 9);
        MV_X_B = 2 * ((MV_X * (iScaleFactor − 256) + 255) >> 9);
        MV_Y_B = 2 * ((MV_Y * (iScaleFactor − 256) + 255) >> 9);
    }
    else {/* Quarter pel units */
        MV_X_F = (MV_X * ScaleFactor + 128) >> 8;
        MV_Y_F = (MV_Y * ScaleFactor + 128) >> 8;
        MV_X_B = (MV_X * (ScaleFactor − 256) + 128) >> 8;
        MV_Y_B = (MV_Y * (ScaleFactor − 256) + 128) >> 8;
    }
End Scale_Direct_MV
```

In Scale_Direct_MV, the inputs MV_X and MV_Y are the x- and y-elements of the MV from the co-located MB of the future reference frame, and the values being computed (i.e. $MV\_X_F$, $MV\_Y_F$, $MV\_X_B$, $MV\_Y_B$) are the components of the forward and backward pointing motion vectors for the macroblock being encoded in direct mode.

As noted above, prior implementations scaled the motion vector of the corresponding macroblock in the future reference frame using timestamp-dependent temporal distances $TR_D$ and $TR_B$. Fraction coding eliminates the need to find $TR_D$ and $TR_B$. Furthermore, in some embodiments, an encoder can change the fraction to represent (e.g., at frame level) different inter-B-frame distances and different numbers of B-frames in a group of pictures. The fraction may or may not reflect true interframe distances. Thus, described embodiments do not necessarily assume constant velocity. For example, the encoder can use heuristics to choose different fractions at encode time based on, for example, the type of motion present in a particular sequence, or the proximity of a particular B-frame to the beginning or end of a sequence. Or, the encoder can check several fractions to determine which fraction is best for coding a particular B-frame or set of B-frames. Adjusting the fraction can help reduce bit cost and increase the usability of direct mode prediction in coding B-frames.

Different fraction values also can be associated with different regions within a frame. For example, the frame area can be divided into multiple regions (e.g., slices, macroblocks, etc.), and each region can be associated with a distinct fraction value. The fraction corresponding to each region can then be sent as part of the bit stream (e.g., at macroblock level or some other level). When different fraction values are sent for different regions, the encoder can account for situations where one part of an image moves differently than another part.

Alternatively, the encoder can encode a B-frame using direct mode prediction without either introducing a timestamp dependency or sending the temporal position of each B frame. For example, the encoder can implicitly assume a fixed interframe distance and fixed number of B-frames in a sequence or group of pictures. However, assuming a fixed interframe distance and a fixed number of B-frames limits flexibility and adaptability to content, imposes a fixed-velocity assumption on the content, and can result in ambiguity when a B-frame is dropped.

C. Signaling Direct Mode and Non-Direct Prediction Modes

Because direct mode prediction in B-frames is an effective tool for reducing bit rate, it is advantageous to reduce signaling overhead to reduce the overall cost of direct mode prediction, especially in low-bit rate situations.

In some embodiments, an encoder encodes direct mode prediction information using a unified bit plane coding technique. For example, an encoder encodes direct mode prediction information in a compressed bit plane, where each bit is associated with a macroblock in the B-frame, and the value of each bit signals whether the macroblock was coded in direct mode or a non-direct prediction mode. The compressed bit plane can be sent at the frame header level or at some other level. For more information on bit plane coding, see U.S. patent application Ser. No. 10/321,415, entitled, "Skip Macroblock Coding," filed Dec. 16, 2002. Alternatively, bits representing direct mode/non-direct mode information can be sent uncompressed at macroblock level, or at some other level.

If non-direct prediction is indicated, the encoder specifies the non-direct prediction mode (e.g., forward mode, backward mode, interpolated mode, or intra mode) for the macroblock. In some embodiments, an encoder codes non-direct prediction modes with reference to a VLC table at macroblock level, as shown in Table 2.

TABLE 2

| | B Frame Motion Prediction Type | |
|---|---|---|
| BMVTYPE | Motion Prediction Type | |
| VLC | BFRACTION <= ½ | BFRACTION > ½ |
| 0 | Backward | Forward |
| 10 | Forward | Backward |
| 11 | Interpolated | Interpolated |

In the example shown in Table 2, VLCs for the prediction modes are based in part on the fraction used for fraction coding in direct mode. In this example, the anchor frame with a smaller fraction (i.e., the anchor frame that is represented in the fraction as being temporally closer to the current B-frame) is preferred. In other words, if the B-frame occurs in the first half of the inter-anchor interval (as specified by BFRACTION, which may or may not correspond to the true temporal relationship) the backward motion mode is coded with one bit, whereas forward and interpolated motion modes are coded with a two-bit signal. In Table 1, backward mode is preferred. Alternatively, the VLC table uses different codes to represent different modes, or prefers forward prediction.

In some embodiments, intra mode is represented using the cheapest code for a prediction mode (e.g., the code for backward or forward mode) followed by a motion vector, which indicates by the manner in which it is coded that the prediction mode is intra mode.

D. B/I Frames

In some embodiments, an encoder encodes an entire B-frame independent of its anchors. Such a frame can be described as an intra B-frame or B/I-frame. A B/I-frame is an intra frame in the sense that the coding of the frame does not depend on reference frames. However, other frames are not permitted to use B/I frames as anchors. Therefore, a B/I frame is not a true I-frame (or key frame) because there is no temporal dependency on the B/I frame and because a B/I-frame does not represent the start of an independently decodable segment or group of pictures.

Certain macroblocks (or other regions) of predicted frames can be encoded as intra-macroblocks. However, designating entire frames as B/I frames is useful in several respects. First, if a device is rendering digital video and needs to immediately drop some frames to keep up with processing demands, B/I-frames can be dropped without a reduction in quality. While a decoder could look for a sequence of non-intra B-frames that it can potentially drop, if these non-intra B-frames are key frames (in other words, frames from which other frames are predicted) then the decoder will be forced to decode them to use as references for other frames. However, if frames are designated as B/I frames, the device can drop them to maintain its processing schedule.

Second, B/I frames allow an encoders to maintain temporal scalability when inter-frame prediction breaks down (e.g., at scene changes or due to complex motion). When inter-frame prediction breaks down in such situations, and most of the macroblocks need to be coded as intra-macroblocks, it is often cheaper in terms of bit cost to code the entire frame as a B/I-frame.

B/I-frames can be signaled in a bit stream in different ways. For example, as explained above in reference to Table 1, some embodiments use a VLC in a VLC table for representing fractions for fraction-coding of B-frames (e.g., the value 1111111 in the BFRACTION VLC table) to signal a B/I frame. Alternatively, a B/I frame can be signaled in an image type field or frame type field (e.g., with a VLC) in the bit stream, in a similar manner as other image types (e.g., P-frames, I-frames, etc.)

E. Motion Vector Prediction for B-Frames

In some embodiments, an encoder/decoder uses forward motion vectors as predictors for forward motion vectors, and backward motion vectors as predictors for backward motion vectors. For example, an encoder buffers previously decoded forward motion vectors in a forward motion vector buffer, and previously decoded backward motion vectors in a backward motion vector buffer. The encoder then uses the decoded forward motion vectors to predict motion vectors in forward mode and decoded backward motion vectors to predict motion vectors in backward mode. For macroblocks that use either direct or interpolated prediction modes, an encoder stores both a forward motion vector component in a forward motion vector buffer, and a backward motion vector component in a backward motion vector buffer. These components are computed implicitly in the case of direct mode prediction and explicitly from received motion vector information in the case of interpolated mode prediction.

An encoder stores forward and backward motion vector components in the buffers for macroblocks predicted in direct mode so direct mode macroblocks can contribute to spatially future MV predictions. If motion vector components for direct mode macroblocks were not stored in such a way (for example, if 0 were stored in the buffers and used as predictors), efficiency would be reduced where motion is present in the direct mode macroblocks. Motion in direct mode macroblocks can be used to predict other motion in a causal neighborhood of the macroblocks. If direct mode prediction is common in a frame (for example, where an encoder employs a scheme that favors direct mode prediction for one or more frames), it becomes important to use a scheme of motion vector prediction such that neighboring macroblocks that do not use direct mode prediction do not suffer from poor motion vector prediction due to 0-value motion vectors from the direct mode macroblocks.

Figure 12:
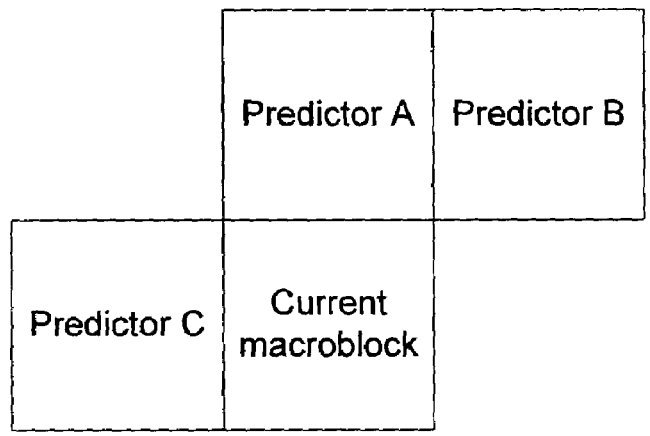
FIGS. 12 and 13 show predictor macroblocks for a current macroblock.
Figure 13:
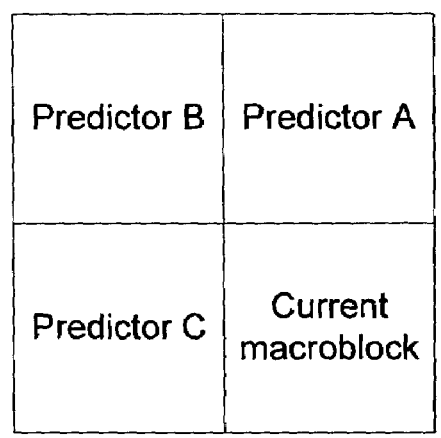

In some embodiments an encoder/decoder performs according to the following rules:

1) If the macroblock is forward-predicted, then median predict its motion vector from the neighborhood of the forward motion vector buffer (see FIGS. 12 and 13). Store the forward motion vector in the forward buffer and 0 in the backward buffer.
2) If the macroblock is backward-predicted, then median predict its motion vector from the neighborhood of the backward motion vector buffer. Store the backward motion vector in the backward buffer and 0 in the forward buffer.
3) If the macroblock is direct-predicted, then store the forward direct motion vector component in the forward buffer and the backward component in the backward buffer.
4) If the macroblock is interpolated, then use the forward motion vector buffer to predict the forward component, the backward buffer to predict the backward component, and store the forward and backward motion vectors, once these have been calculated, in the forward and backward motion vector buffers, respectively.

For intra-mode macroblocks, 0 is entered for the forward and backward buffers, since motion is assumed to be zero.

FIGS. 12 and 13 show predictor blocks for motion vector prediction using the median of previously decoded neighborhood motion vectors. FIG. 12 shows predictors A, B and C for a current macroblock that is not the last macroblock in a macroblock row. FIG. 13 shows predictors A, B and C for a current macroblock that is the last macroblock in a macroblock row. In some embodiments, an encoder/decoder uses median-of-three prediction to determine a predictor for the current macroblock from among the three predictors A, B and C.

Figure 14:
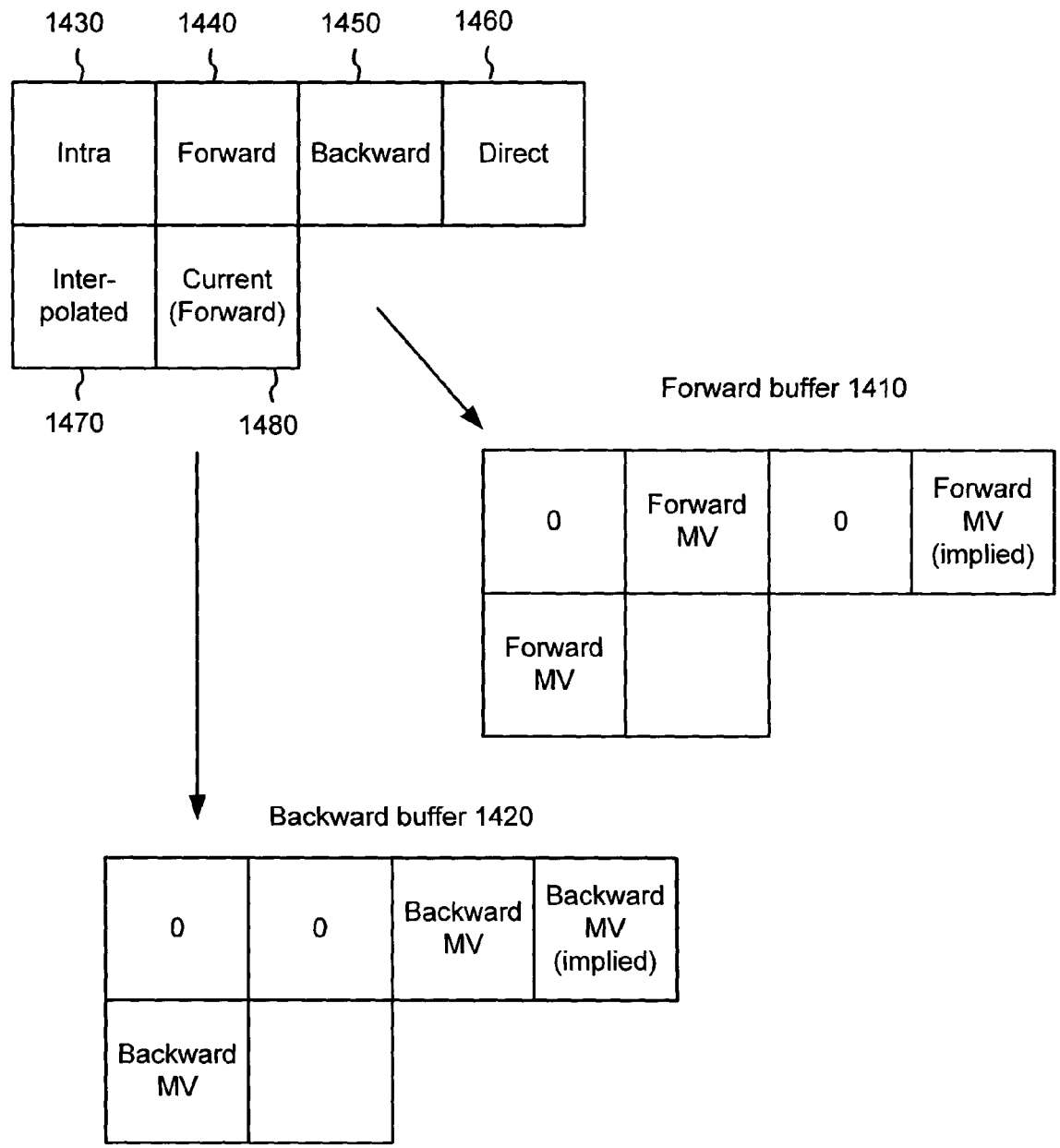
FIG. 14 shows motion vectors in a forward motion vector buffer and a backward motion vector buffer for predicting motion vectors for macroblocks.

For example, FIG. 14 shows motion vectors in a forward motion vector buffer 1410 and a backward motion vector buffer 1420 for predicting motion vectors for macroblocks. A video image includes an intra mode macroblock 1430, a forward mode macroblock 1440, a backward mode macroblock 1450, a direct mode macroblock 1460, an interpolated mode macroblock 1470, and a current macroblock 1480 for which a macroblock is to be predicted in forward mode. For the intra mode macroblock 1430, 0 is in both the forward and backward buffers. For the forward mode macroblock 1440, a forward motion vector is in the forward buffer, and a 0 is in the backward buffer. For the backward mode macroblock 1450, a 0 is in the forward buffer, and a backward motion vector is in the backward buffer. For the direct mode macroblock 1460, an implied forward motion vector is in the forward buffer, and an implied backward motion vector is in the backward buffer. For the interpolated mode macroblock 1470, a forward motion vector is in the forward buffer, and a backward motion vector is in the backward buffer.

To predict the motion vector for the current macroblock 1480 in forward mode, an encoder uses median-of-three prediction from predictors among the neighboring macroblocks for the current macroblock—the forward motion vector corresponding to forward mode macroblock 1440, the 0 corresponding backward mode macroblock 1450, and the forward motion vector corresponding to interpolated mode macroblock 1470.

The procedure Median3 is described below:

```
Median3 (a, b, c)
    if (a > b) {
        if (b > c)
```

```
        median = b
    else if (a > c)
        median = c
    else
        median = a
    }
    else if (a > c)
        median = a
    else if (b > c)
        median = c
    else median = b
    return median
End Median3
```

F. Selection of Motion Vector Resolutions and Filters for B Frames

In some embodiments, an encoder encodes B-frames using a selection of filters and motion vector resolutions.

Motion vector components are usually specified in terms of pixel displacements, often with sub-pixel accuracy. Sub-pixel displacements are realized by filtering the reference frame using appropriately defined motion compensation filters. For the case of rectilinear sub-pixel motion compensation, the x- and y-components are represented as fixed-point numbers. The integer part of these numbers is called the full-pixel shift, and the fractional part is called the sub-pixel shift. When the sub-pixel shift is zero, the motion is an integer number of pixels. Most often, this is implemented as a block copy from the reference frame to generate the predictor (although, in theory, some form of filtering could potentially be applied). On the other hand, when the sub-pixel shift is non-zero, the predictor is generated by applying one or more filters corresponding to the sub-pixel shift to integer-pixel locations in the reference frame. Therefore, the motion compensation filter is determined by the sub-pixel shift.

To implement sub-pixel shifts as filtering operations, motion compensation filters interpolate data points at fractional pixel locations based on reference values at integer-pixel locations. In general, the quality of interpolation increases with the support of the filter. Some embodiments use separable 2-tap and 4-tap (in each direction) filters, which correspond to bilinear and bicubic interpolators. For more information on motion vector resolutions and interpolation filters, see U.S. patent application Ser. No. 10/382,311, entitled, "Sub-Pixel Interpolation in Motion Estimation and Compensation," filed Mar. 4, 2003.

Different filters and different motion vectors can be applicable in different encoding scenarios. For example, as between P- and B-frames in a sequence, since compression artifacts in P-frames propagate across the sequence, finer quantization factors are often chosen for P-frames, resulting in higher visual quality. On the other hand, B-frames are often quantized using relatively higher values, although due to the bi-directional nature of their prediction, B-frames often have similar visual quality. While P-frame motion vectors are often chosen to favor quality, B-frame motion vectors are often chosen to favor bit rate efficiency. Providing a choice of motion vector modes for B-frames promotes bit rate efficiency and is therefore a key ingredient in some embodiments.

In general, when encoding video images at high bit rates, it can be expected that a reconstructed reference frame is relatively free from distortion and that motion vector cost is not significant relative to the available bit rate. The encoder can benefit significantly with higher degrees of flexibility, such as the flexibility offered by more motion vectors (e.g., four motion vectors per macroblock when encoding P-frames) or finer sub-pixel motion resolution (e.g., quarter pixel resolution as opposed to half-pixel resolution). When a reference image is relatively free from distortion, longer filters can be used to reduce information loss across the sequence for slowly moving scenes. Conversely, when the available bit rate is low, motion vectors become very expensive, and reducing the number and resolution of motion vectors becomes important. At low bit rates, when image reconstruction tends to be noisy, an encoder can use filters that smooth out noise, such as bilinear filters.

Thus, in some embodiments, a video encoder/decoder is capable of using different motion vector resolutions and/or interpolation filters for B-frames. For example, a video encoder/decoder chooses (e.g., based on an evaluation of the efficiency of each choice) from among the following motion vector resolution/interpolation filter modes for B-frames:

1) Quarter-pixel resolution, bicubic interpolation filter
2) Half-pixel resolution, bicubic interpolation filter
3) Half-pixel resolution, bilinear interpolation filter The chosen mode is signaled, for example, at the frame level through a variable length code.

In some embodiments, an encoder encodes B-frames uses one motion vector per macroblock, and using four motion vectors per macroblock is not permitted. Such embodiments are based on experiments that indicate that allowing four motion vectors per macroblock in B-frames is often uneconomical. P-frames, which can be used as reference frames for B-frames, can use four motion vectors per macroblock. P-frames that use four motion vectors actually use a combination of four-motion-vector and one-motion-vector macroblocks, and the percentage of four-motion-vector macroblocks in a given P-frame is usually less than 40%. The intersection of areas occupied by macroblocks from past and future reference frames of a current B-frame that both use four-motion-vector prediction can be expected to be an even smaller percentage. Furthermore, in embodiments where direct mode prediction is favored, many macroblocks in a given B-frame can be expected to be coded by simply scaling motion vectors from a reference frame.

In embodiments where four-motion-vector prediction is not allowed, an encoder uses a four-to-one converter to convert those macroblocks that use four motion vectors in the future reference frame to use one motion vector for possible use in direct mode of a current B-frame. This procedure is described below:

```
4_To_1MV (4MV_X)
    1MV_X = Medianof4 (MV_Xa, MV_Xb, MV_Xc, MV_Xd);
    1MV_Y = Medianof4 (MV_Ya, MV_Yb, MV_Yc, MV_Yd);
End 4_To_1MV
```

In the above procedure, MV_Xa, MV_Xb, MV_Xc and MV_Xd are the x-components of the four motion vectors that need to be converted to one motion vector, and MV_Ya, MV_Yb, MV_Yc and MV_Yd are the y-components. The procedure Medianof4 is outlined below:

```
Medianof4 (a0, a1, a2, a3)
    max = min = a0;
    if (a1 > max)
        max = a1;
```

-continued

```
        else if (a1 < min)
            min = a1;
        if (a2 > max)
            max = a2;
        else if (a2 < min)
            min = a2;
        if (a3 > max)
            max = a3;
        else if (a3 < min)
            min = a3;
        return (a0 + a1 + a2 + a3 – max – min) / 2;
End Medianof4
```

G. Pro-Active B-Frame Dropping in One-Pass Constant Bit Rate Encoding

Under any compression scheme, when there is insufficient bandwidth available for the rate at which the sequence is encoded, some data must be dropped. In one-pass constant bit rate encoding, determining which frames are most suitable for dropping is particularly difficult because it is not known ahead of time how the sequence will evolve or what the bit rate requirement will be on a per-frame basis. For example, a naïve algorithm that encodes every frame until it runs out of bandwidth would output all frames at the beginning, followed by long runs of dropped frames interspersed with runs of coded frames where motion is small or where static backgrounds predominate. Unfortunately, these are the least visually interesting sections of video.

In general, B-frames are better candidates for dropping than I- or P-frames, because they typically are not needed to decode other frames. Thus, under constant bit rate constraints, an acceptable one-pass algorithm might be one that selectively drops only (or mainly) B-frames. However, two slightly harder problems are how to ensure that the algorithm only (or mainly) drops B-frames, and how to ensure that the algorithm does not drop too many B-frames.

The first problem can be addressed by monitoring the available bit rate and pro-actively dropping one or more B-frames before the bit budget goes to zero. The second problem can be addressed by consulting a history of previously dropped frames in the sequence being encoded, and dropping a current B-frame if the number of bits needed to code it is high in comparison to a moving average of bits per encoded frame.

In some embodiments, pro-active dropping of B-frames under one-pass constant bit rate encoding is governed by the following heuristic:

IF (more than half of the last N frames were dropped)
AND (bits needed for this B-frame>Average bits per frame for the last N frames)
OR (less than half of the last N frames were dropped)
AND (bits needed for this B-frame>2×Average bits per frame for the last N frames)
THEN drop this B-frame This heuristic covers a broad range of possibilities because the average bits per frame for the last N frames includes all types of frames (e.g., I-frames, P-frames and B-frames). Thus, the inclination to drop any frame at the start of the sequence immediately following an I-frame is negligible, as I-frames are usually an order of magnitude (or greater) more expensive to code than B frames. Furthermore, in addition to the above heuristic, in pro-active frame dropping the usual rules of dropping frames to stay within the allowed bit budget will still apply, irrespective of frame type. For example, this scheme does not guarantee dropping only B-frames. However, most dropped frames are likely to be B-frames, improving the viewing experience.

While the heuristic may not be optimal (e.g., it might be intractable to know which frames are most suitable for dropping and to not drop any more than the minimum required number), the heuristic is fast (O(1)) and the drop/no-drop decision is taken by the encoder at the frame level. The effect of this algorithm on the viewing experience of a low bit rate decoded stream (e.g. video telephony) is that there appears to be a regular temporal sub-sampling of the video (e.g., sub-sampling a 30 fps sequence at 10 fps for a sequence coded with an I-B-B-P pattern), rather than video with long runs of dropped frames.

In other embodiments, a frame-dropping algorithm consults statistics for each frame type, adapts frame-dropping thresholds over time, and consults the remaining bit budget to make frame-dropping decisions.

H. Indicating Dropped P-Frames

In a video encoder/decoder, P-frames may be dropped for a variety of reasons. For example, P-frames may be dropped when there has been no appreciable change from a previous I- or P-frame, or when there is insufficient bandwidth to encode the P-frame. In the event of a dropped P-frame, decoding B-frames becomes at best ambiguous, and at worst incorrect.

Consider, for example, the following encoded frame pattern:

I0 B1 P2 B3 P4

Assume that P-frame P2 is very similar to I-frame I0 and is therefore dropped. Furthermore, assume B-frame B1 (which would normally have I0 and P2 as anchors) has a strongly transient image (e.g., a visual of a gunshot) making it different from both I0 and P2. Since P2 is dropped, both the anchors of B1 are I0. Likewise, the anchors of B3 are I0 and P4. If no adjustment is made to the bit stream, the following frame sequence is transmitted to the receiver:

I0 B1 B3 P4

The transmitted sequence erroneously implies that the anchors of B1 are I0 and P4. This is not the case (and for reasons of latency, it is also not desirable from a design standpoint). The transmitted bit stream is missing the key information that P2 has been dropped.

In some embodiments, an encoder indicates a dropped P-frame by stuffing arbitrary data (e.g., a single byte) in the place where P2 would have been in the sequence. The size of the stuffed data is chosen to be smaller than the smallest possible valid compressed frame to avoid decoding ambiguity. Using arbitrary data in a bit stream to indicate a dropped P-frame works because frames are clearly identified and demarcated in the sequence syntax (e.g., ASF layer). Motion vectors for dropped P-frames are assumed to be 0.

In such embodiments, the cost of indicating a dropped P-frame is the cost of the coded dropped P-frame itself (e.g., one byte) plus the sequence layer (e.g., ASF) overhead associated with a frame. For the above example, it is necessary to re-display the reconstruction of I0 at the display time of P2, since the transient event occurring in B1 is no longer present. It is therefore necessary to signal the display time of P2.

Alternatively, dropped P-frames can be indicated using bit plane coding to efficiently code the entire frame as dropped macroblocks. For more information on bit plane coding, see U.S. patent application Ser. No. 10/321,415, entitled, "Skip Macroblock Coding," filed Dec. 16, 2002. This is slightly less efficient, although in practice the coded frame cost of either approach is usually small compared to the sequence layer overhead.

Having described and illustrated the principles of our invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. In a computing device that implements a video decoder, the computing device including a processor and memory, a method of decoding images in a sequence of video images, the method comprising:
receiving and decoding, with the computing device that implements the video decoder, a code in a bit stream to determine a fraction for a current image in the sequence, wherein the fraction represents an estimated temporal distance position for the current image relative to an interval between a first reference image for the current image and a second reference image for the current image, and wherein the determination of the fraction is independent of actual temporal distance positions of the respective reference images; and
for motion compensation for a direct mode macroblock in the current image, with the computing device that implements the video decoder, processing the fraction along with a motion vector for a co-located macroblock in the first reference image, wherein the motion vector represents motion in the first reference image relative to the second reference image, and wherein the processing the fraction along with the motion vector results in a representation of motion for the direct mode macroblock in the current image relative to the first reference image and relative to the second reference image.

2. The method of claim 1 wherein the fraction is represented by the code, and wherein the code comprises a variable length code in the bit stream.

3. The method of claim 1 wherein the fraction is selected from a set of discrete values, wherein each of the values is greater than zero and less than one so as to indicate the estimated temporal distance position within the interval.

4. The method of claim 1 wherein the fraction is selected from the group consisting of: ½, ⅓, ⅔, ¼, ¾, ⅕, ⅖, ⅗, ⅘, ⅙, ⅚, 1/7, 2/7, and 3/7.

5. The method of claim 1 wherein the estimated temporal distance position for the current image relative to the interval between the first reference image for the current image and the second reference image for the current image is not the true temporal distance position of the current image.

6. The method of claim 1 wherein the fraction is based on motion information for the sequence of video images.

7. The method of claim 1 wherein the fraction is based on a proximity of the current image to an end of the sequence of video images.

8. The method of claim 1 further comprising, with the computing device that implements the video decoder, repeating the acts of claim 1 for each of plural bi-directionally predicted images in the sequence of video images.

9. The method of claim 2 wherein the determination of the fraction comprises looking up the variable length code in a variable length code table to obtain a value for the fraction.

10. The method of claim 9 wherein at least one entry in the variable length code table represents a frame type, and wherein the frame type is B/I-frame.

11. The method of claim 1 wherein the processing the fraction along with the motion vector comprises scaling the motion vector for the co-located macroblock using the fraction.

12. The method of claim 11 wherein the scaling the motion vector for the co-located macroblock comprises scaling a vertical component and a horizontal component of the motion vector for the co-located macroblock.

13. The method of claim 11 wherein the scaling the motion vector for the co-located macroblock comprises:
scaling the motion vector for the co-located macroblock by a factor of the fraction, to obtain an implied forward motion vector for the direct mode macroblock; and
scaling the motion vector for the co-located macroblock by a factor of the fraction minus one, to obtain an implied backward motion vector for the direct mode macroblock.

14. The method of claim 13 wherein the motion compensation comprises:
addressing a macroblock in the future reference image using the implied forward motion vector;
addressing a macroblock in the previous reference image using the implied backward motion vector; and
predicting the current macroblock using an average of the macroblock in the future reference image and the macroblock in the previous reference image.

15. In a computing device that implements a video encoder, the computing device including a processor and memory, a method of encoding images in a sequence of video images, the method comprising:
with the computing device that implements the video encoder, determining a fraction for a current image in the sequence, wherein the current image has a previous reference image and a future reference image, and wherein the fraction represents a temporal position for the current image relative to the respective reference images;
with the computing device that implements the video encoder, selecting direct mode prediction for a current direct mode macroblock in the current image;
with the computing device that implements the video encoder, finding a motion vector for a co-located macroblock in the future reference image;
with the computing device that implements the video encoder, scaling the motion vector for the co-located macroblock using the fraction;
with the computing device that implements the video encoder, using results of the scaling in motion compensation for the current direct mode macroblock in the current image; and
with the computing device that implements the video encoder, outputting a code in a bit stream, wherein the code represents the fraction, and wherein the outputting the code facilitates determination of the fraction independent of actual temporal positions of the respective reference images during decoding.

16. The method of claim 15 wherein the fraction facilitates representation of variable velocity motion in the direct mode prediction.

17. The method of claim 15 wherein the scaling the motion vector for the co-located macroblock comprises scaling a vertical component and a horizontal component of the motion vector for the co-located macroblock.

18. The method of claim 15 wherein the scaling the motion vector for the co-located macroblock comprises:

scaling the motion vector for the co-located macroblock by a factor of the fraction, to obtain an implied forward motion vector for the current direct mode macroblock; and scaling the motion vector for the co-located macroblock by a factor of the fraction minus one, to obtain an implied backward motion vector for the current direct mode macroblock, wherein for the direct mode macroblock the motion compensation uses the implied forward motion vector and the implied backward motion vector.

19. A system comprising:
one or more processors;
memory;
at least one input device, output device or communication connection; and
one or more storage media having stored thereon computer-executable instructions for causing one or more computers to perform a method of decoding images in a sequence of video images, the method comprising:
receiving and decoding a code in a bit stream to determine a fraction for a current image in the sequence, wherein the fraction represents an estimated temporal distance position for the current image relative to an interval between a first reference image for the current image and a second reference image for the current image, and wherein the determination of the fraction is independent of actual temporal distance positions of the respective reference images; and
for motion compensation for a direct mode macroblock in the current image, processing the fraction along with a motion vector for a co-located macroblock in the first reference image, wherein the motion vector represents motion in the first reference image relative to the second reference image, and wherein the processing the fraction along with the motion vector results in a representation of motion for the direct mode macroblock in the current image relative to the first reference image and relative to the second reference image.

20. The system of claim 19 wherein the fraction is represented by the code, and wherein the code comprises a variable length code in the bit stream.

21. The system of claim 19 wherein the fraction is selected from a set of discrete values, wherein each of the values is greater than zero and less than one so as to indicate the estimated temporal distance position within the interval.

22. The system of claim 19 wherein the fraction is selected from the group consisting of: ½, ⅓, ⅔, ¼, ¾, ⅕, ⅖, ⅗, ⅘, ⅙, ⅚, 1/7, 2/7, and 3/7.

23. The system of claim 19 wherein the estimated temporal distance position for the current image relative to the interval between the first reference image for the current image and the second reference image for the current image is not the true temporal distance position of the current image.

24. The system of claim 19 wherein the fraction is based on motion information for the sequence of video images.

25. The system of claim 19 wherein the fraction is based on a proximity of the current image to an end of the sequence of video images.

26. The system of claim 19 wherein the determination of the fraction comprises looking up the code in a code table to obtain a value for the fraction.

27. The system of claim 26 wherein at least one entry in the code table represents a frame type, and wherein the frame type is B/I-frame.

28. In a computing device that implements a video encoder, the computing device including a processor and memory, a method of encoding images in a sequence of video images, the method comprising:
with the computing device that implements the video encoder, determining a fraction for a current image in the sequence, wherein the fraction represents an estimated temporal distance position for the current image relative to an interval between a first reference image for the current image and a second reference image for the current image, and wherein the determination of the fraction is independent of actual temporal distance positions of the respective reference images;
for motion compensation for a direct mode macroblock in the current image, with the computing device that implements the video encoder, processing the fraction along with a motion vector for a co-located macroblock in the first reference image, wherein the motion vector represents motion in the first reference image relative to the second reference image, and wherein the processing the fraction along with the motion vector results in a representation of motion for the direct mode macroblock in the current image relative to the first reference image and relative to the second reference image; and
with the computing device that implements the video encoder, outputting a code in a bit stream, wherein the code represents the fraction.

29. The method of claim 28 wherein the code comprises a variable length code in the bit stream.

30. The method of claim 28 wherein the fraction is selected from a set of discrete values, wherein each of the values is greater than zero and less than one so as to indicate the estimated temporal distance position within the interval.

31. The method of claim 28 wherein the fraction is selected from the group consisting of: ½, ⅓, ⅔, ¼, ¾, ⅕, ⅖, ⅗, ⅘, ⅙, ⅚, 1/7, 2/7, and 3/7.

32. The method of claim 28 wherein the estimated temporal distance position for the current image relative to the interval between the first reference image for the current image and the second reference image for the current image is not the true temporal distance position of the current image.

33. The method of claim 28 wherein the fraction is based on motion information for the sequence of video images.

34. The method of claim 28 wherein the fraction is based on a proximity of the current image to an end of the sequence of video images.

35. The method of claim 28 wherein the determination of the fraction comprises looking up the code in a code table to obtain a value for the fraction.

36. The method of claim 35 wherein at least one entry in the code table represents a frame type, and wherein the frame type is B/I-frame.

37. The method of claim 28 wherein the determining the fraction comprises:
evaluating each of plural fractions to determine bit costs for encoding the current image using the respective fractions; and
selecting the fraction based on the evaluating.

38. A system comprising:
one or more processors;
memory;
at least one input device, output device or communication connection; and
one or more storage media having stored thereon computer-executable instructions for causing one or more computers to perform a method of encoding images in a sequence of video images, the method comprising:

determining a fraction for a current image in the sequence, wherein the fraction represents an estimated temporal distance position for the current image relative to an interval between a first reference image for the current image and a second reference image for the current image, and wherein the determination of the fraction is independent of actual temporal distance positions of the respective reference images;

for motion compensation for a direct mode macroblock in the current image, processing the fraction along with a motion vector for a co-located macroblock in the first reference image, wherein the motion vector represents motion in the first reference image relative to the second reference image, and wherein the processing the fraction along with the motion vector results in a representation of motion for the direct mode macroblock in the current image relative to the first reference image and relative to the second reference image; and outputting a code in a bit stream, wherein the code represents the fraction.

39. The system of claim 38 wherein the code comprises a variable length code in the bit stream.

40. The system of claim 38 wherein the fraction is selected from a set of discrete values, wherein each of the values is greater than zero and less than one so as to indicate the estimated temporal distance position within the interval.

41. The system of claim 38 wherein the fraction is selected from the group consisting of: ½, ⅓, ⅔, ¼, ¾, ⅕, ⅖, ⅗, ⅘, ⅙, ⅚, 1/7, 2/7, and 3/7.

42. The system of claim 38 wherein the estimated temporal distance position for the current image relative to the interval between the first reference image for the current image and the second reference image for the current image is not the true temporal distance position of the current image.

43. The system of claim 38 wherein the fraction is based on motion information for the sequence of video images.

44. The system of claim 38 wherein the fraction is based on a proximity of the current image to an end of the sequence of video images.

45. The system of claim 38 wherein the determination of the fraction comprises looking up the code in a code table to obtain a value for the fraction.

46. The system of claim 45 wherein at least one entry in the code table represents a frame type, and wherein the frame type is B/I-frame.

47. The system of claim 38 wherein the determining the fraction comprises:
evaluating each of plural fractions to determine bit costs for encoding the current image using the respective fractions; and
selecting the fraction based on the evaluating.

48. A system comprising:
one or more processors;
memory;
at least one input device, output device or communication connection; and
one or more storage media having stored thereon computer-executable instructions for causing one or more computers to perform a method of encoding images in a sequence of video images, the method comprising:
determining a fraction for a current image in the sequence, wherein the current image has a previous reference image and a future reference image, and wherein the fraction represents a temporal position for the current image relative to the respective reference images;
selecting direct mode prediction for a current direct mode macroblock in the current image;
finding a motion vector for a co-located macroblock in the future reference image;
scaling the motion vector for the co-located macroblock using the fraction;
using results of the scaling in motion compensation for the current direct mode macroblock in the current image; and
outputting a code in a bit stream, wherein the code represents the fraction, and wherein the outputting the code facilitates determination of the fraction independent of actual temporal positions of the respective reference images during decoding.

49. The system of claim 48 wherein the fraction facilitates representation of variable velocity motion in the direct mode prediction.

50. The system of claim 48 wherein the scaling the motion vector for the co-located macroblock comprises scaling a vertical component and a horizontal component of the motion vector for the co-located macroblock.

51. The system of claim 48 wherein the scaling the motion vector for the co-located macroblock comprises:
scaling the motion vector for the co-located macroblock by a factor of the fraction, to obtain an implied forward motion vector for the current direct mode macroblock; and
scaling the motion vector for the co-located macroblock by a factor of the fraction minus one, to obtain an implied backward motion vector for the current direct mode macroblock, wherein for the current direct mode macroblock the motion compensation uses the implied forward motion vector and the implied backward motion vector.

* * * * *

UNITED STATES PATENT AND TRADEMARK OFFICE
CERTIFICATE OF CORRECTION

PATENT NO. : 7,609,763 B2 Page 1 of 1
APPLICATION NO. : 10/622378
DATED : October 27, 2009
INVENTOR(S) : Mukerjee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1726 days.

Signed and Sealed this

Twelfth Day of October, 2010

David J. Kappos
*Director of the United States Patent and Trademark Office*